United States Patent [19]
Carlisle et al.

[11] Patent Number: 5,649,118
[45] Date of Patent: Jul. 15, 1997

[54] SMART CARD WITH MULTIPLE CHARGE ACCOUNTS AND PRODUCT ITEM TABLES DESIGNATING THE ACCOUNT TO DEBIT

[75] Inventors: William Reid Carlisle, Morristown; Lydia Anne Curtis, Bridgewater; Kathleen M. Murphy, Bedminster; Richard John Skibo, Skillman, all of N.J.

[73] Assignee: Lucent Technologies Inc., Murray Hill, N.J.

[21] Appl. No.: 250,144

[22] Filed: May 27, 1994

Related U.S. Application Data

[63] Continuation-in-part of Ser. No. 112,487, Aug. 27, 1993, abandoned.

[51] Int. Cl.[6] .............................. G06F 17/60; G06G 7/52
[52] U.S. Cl. ............................................. 395/241; 395/240
[58] Field of Search ............................ 364/401; 380/24; 902/26; 395/241, 240

[56] References Cited

U.S. PATENT DOCUMENTS 5,256,863  10/1993  Ferguson et al. .

*Primary Examiner*—Gail O. Hayes
*Assistant Examiner*—George N. Stevens
*Attorney, Agent, or Firm*—Steven R. Bartholomew

[57] ABSTRACT

Systems and methods are disclosed wherein a single set of consumer items may be purchased by debiting any of a plurality of accounts stored on a smart card. According to an embodiment disclosed herein, a point-of-sale terminal includes a terminal processor, an item identification device, a terminal memory, and a smart card reader. The item identification device may include a conventional UPC bar code reader adapted to read UPC bar codes on consumer items. A cost table and a plurality of item tables are electronically stored in terminal memory. The cost table associates each item identifier (UPC bar code) with a corresponding cost. Each item table contains a list of item identifiers, and may optionally associate specific item identifiers with corresponding accounts. Each item table is uniquely identified using an item table identifier. The terminal memory, item identification device, and smart card reader are all coupled to the terminal processor. A smart card is equipped with smart card memory for storing a plurality of data files, and a smart card processor adapted to execute a software operating system for managing the plurality of data files. Each data file associates an account identifier for uniquely specifying a given account with an account balance and at least one item table identifier. Accounts are implemented, for example, by service providers such as Visa, MasterCard, Discover, ATM networks, food stamp programs, other types of welfare programs, unemployment compensation, or the like.

6 Claims, 11 Drawing Sheets

SMART CARD WITH MULTIPLE CHARGE ACCOUNTS AND PRODUCT ITEM TABLES DESIGNATING THE ACCOUNT TO DEBIT

CROSS-REFERENCE TO RELATED APPLICATIONS

This application is a continuation-in-part of application Ser. No. 08/112,487, filed on Aug. 27, 1993; and now abandoned.

FIELD OF THE INVENTION

This invention relates generally to portable smart cards and, more specifically, to systems and methods which provide a smart card having the capability to selectively debit any of a plurality of accounts.

BACKGROUND OF THE INVENTION

Advances in microelectronics have made it possible to put a vast amount of computing power in a small space. In fact, it is possible to effectively put an entire computer inside a credit card, creating thereby a "smart card". Because of the tremendous processing and memory capabilities of the smart card, it is expected that smart cards will replace conventional credit cards which, typically, serve to confirm the right of the card's holder to debit a given account.

The memory in existing smart cards is large enough to hold the programs and data of a number of service providers. That is, there is sufficient memory to allow, for example, Visa, MasterCard, Discover and American Express, to coexist on a single smart card. However, in a present-day point-of-sale environment, state-of-the-art smart cards provide a payment structure whereby a set of items must be paid for by debiting a single account. If one chooses to pay for a single set of items by debiting a plurality of accounts, separate debiting transactions are required for each account. Examples of such systems are disclosed in Anderl et al., U.S. Pat. No. 4,816,653, and Dethloff et al., U.S. Pat. No. 4,837,422.

An additional shortcoming of existing smart card systems is that they do not provide a commercially feasible solution to the problem of performing financial transactions for a plurality of service providers. It is believed that the reason for this state of affairs is a number of security problems have not been solved. One problem, for example, arises in connection with defining the card's owner and the powers to be conferred to this owner, relative to the files in the smart card's memory. Stated in commercial terms, the question is to what extent does the owner of a smart card (who may also be a service provider) have powers over the smart card that are inconsistent with the security that other service providers seek. For example, the system described in the Dethloff et al. patent requires the original service provider to enter additional information into the smart card before a new service provider can offer its services on the card. This information must be entered by the original service provider, even if the new service provider uses an account which is separated from that of the first service provider. In this manner, prior art systems create a commercial conflict between competitive services, which fosters a desire by some providers to restrict access by their customers to competing services.

SUMMARY OF THE INVENTION

Systems and methods are disclosed wherein a single set of consumer items may be purchased by debiting any of a plurality of accounts stored on a smart card. According to an embodiment disclosed herein, a point-of-sale terminal includes a terminal processor, an item identification device, a terminal memory, and a smart card reader. The item identification device is adapted to obtain an item identifier from any of a plurality of consumer items. This item identifier uniquely identifies specific items or categories of items. The item identification device may include a conventional UPC bar code reader adapted to read conventional UPC bar codes affixed to and/or imprinted upon various consumer items. Alternatively, or in addition to the bar code reader, the item identification device may include a manual data entry device for manually entering a code or description corresponding to a given item. A cost table and a plurality of item tables are electronically stored in terminal memory. The cost table associates each item identifier with a corresponding cost. Each item table contains a list of item identifiers, and may optionally associate specific item identifiers with corresponding accounts. Each item table is uniquely identified using an item table identifier. The terminal memory, item identification device, and smart card reader are all coupled to the terminal processor.

A smart card is equipped with smart card memory for storing a plurality of data files, and a smart card processor adapted to execute a software operating system for managing the plurality of data files. Each data file associates an account identifier for uniquely specifying a given account with an account balance and at least one item table identifier. Accounts are implemented, for example, by service providers such as Visa, MasterCard, Discover, ATM networks, food stamp programs, other types of welfare programs, unemployment compensation, or the like.

A plurality of arbitrarily-selected items is presented at the point-of-sale terminal, thus constituting a single set of items. The terminal processor activates the smart card reader to upload data files from the smart card memory to the terminal processor. In response to the data files uploaded from the smart card memory, the terminal processor retrieves at least one item table from terminal memory. The terminal processor then activates the item identification device. As each item is identified, the terminal processor compares the item identifier obtained from the item to the items listed in the at least one item table retrieved from terminal memory. If an item identifier corresponds to an item on the item table, the account specified by the item table is debited for the cost of the item by searching the cost table for the item identifier and downloading the cost of the item, and/or a new account balance, from the terminal processor to the smart card processor. If the account balance is downloaded to the smart card processor, this step may be performed after the last item in the single set of items has been identified by the item identification device. In this case, the item costs are subtracted from the account balances which were previously uploaded into the terminal processor. If an item identifier does not correspond to any of the items in the item table, the cost of the item is retrieved from the cost table and added to a residual account which includes the costs of all items having item identifiers obtained by the item identification device which do not correspond to any of the items in the item table. If an item identifier obtained by the item identification device exists in a plurality of item tables, a debt priority algorithm is executed by the terminal processor to allocate the cost of the item amongst the plurality of accounts associated with the plurality of item tables. After the entire set of items is identified by the point-of-sale terminal, the total balance of the residual account is debited from an account balance corresponding to a specific account selected at the point-of-sale terminal, or by executing the debt priority algorithm.

DETAILED DESCRIPTION

Improved systems and methods applicable to smart cards in a point-of-sale environment are described in FIGS. 1–14. In general, the point-of-sale transactions work in the following manner. A card holder (i.e., a consumer) selects a plurality of consumer items to be purchased and brings them to a point-of-sale configuration which includes a smart card reader. The consumer items each include a conventional Universal Price Code (UPC) bar code identifier, which may be conceptualized as an item identifier. The consumer inserts the smart card into the smart card reader, thereby activating a sequence of operations for debiting a plurality of accounts. The operational sequence implements the following functions. The Universal Price Code (UPC) of the consumer item to be purchased, i.e., the item identifier, is read by an item identification device, for example, by scanning the bar code of the item or by entering the code manually into a keypad at the point-of-sale terminal. Based upon the UPC code and one or more application identifiers held on the smart card, the point-of-sale terminal compares the UPC against item tables stored in memory which identify the item's eligibility for debit against one or more of the card holder's accounts. If an item is eligible for more than one account, a debit priority algorithm determines which of the accounts should be debited. The debit priority algorithm may utilize one or more debt allocation tables which, for each of a plurality of item identifiers, sets forth a priority ranking for a plurality of accounts. The comparison of item UPC codes for purchased items to UPC codes stored in the item arrays can be done as the UPC code of each item is entered at the point-of-sale terminal. Alternatively, UPC codes for each individual item can be buffered until all items for a given point-of-sale transaction are entered. The individual items are then debited into individual accounts. Additionally, the card holder is provided with the ability to mix account balance categories (dollars, specific item identification, item quantity, etc.) on a single card for a single transaction corresponding to a plurality of accounts. The functions described in the previous paragraphs will be described in greater detail hereinafter. First, the software operating system of the smart card will be considered.

Figure 1:
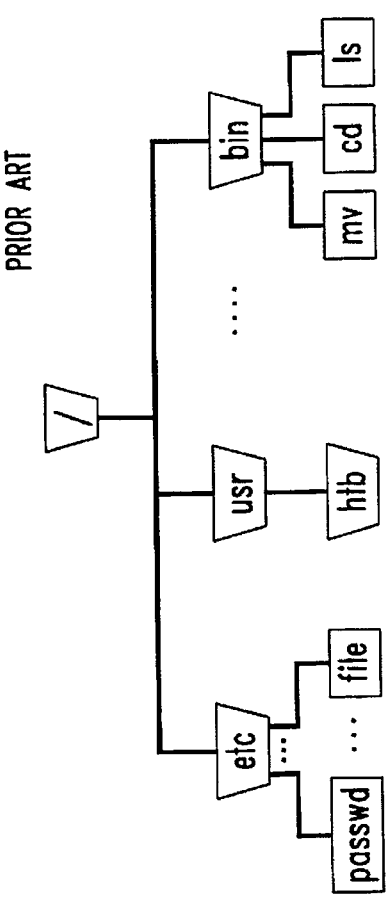
FIG. 1 depicts the structure of the UNIX operating system.

With reference to FIG. 1, the features of the invention may be provided through the utilization of a hierarchical software operating system. Such an operating system should allow different service providers to coexist on a smart card with none of the service providers, nor the owner of the smart card, having access to the files created for, or by, each of the resident service providers unless authorized in advance.

The operating system of the smart card, somewhat akin to the UNIX® (registered trademark of UNIX System Laboratories) operating system, includes a root directory that is owned by the smart card's issuer/owner, and each service provider is a "user" that is installed by the issuer/owner. Each such user is provided with a subdirectory of the root directory and within the subdirectory the user creates files and subdirectories with files, as the user deems necessary.

The operating system prevents all users of the smart card, including the smart card's issuer/owner and the smart card's holder, from accessing any files that are owned by any other user, when that user chooses to prevent such access. This power to exclude is effected through a password file that is owned by the user and which cannot be altered by any other user, including the smart card's issuer/owner. Optionally, the smart card's issuer/owner is given the power to erase all files of a given user.

The operating system also includes means for digital signature-supplemented communication as well as for completely encrypted communication. This capability imparts confidence in remote communications, which permits remote provisioning, effective maintenance of a database that keeps track of all services contained in each smart card, and re-provisioning of a smart card in case of loss or general failure of the smart card.

A number of smart card operating systems are already known. One example is disclosed in the aforementioned Anderl et al. reference. The operating system described below has many similarities to that operating system and to the well-known UNIX operating system. A brief description of some well-known aspects of the UNIX operating system will help in understanding the smart card operating system disclosed herein.

The UNIX Operating System

The UNIX operating system comprises a collection of files. Some are files that primarily contain information about related files, and they are called directory files or directories. Others are files that contain user data, and they are "normal" files. Also in the UNIX operating system, a user can be the "owner" of the file, can belong to a specified "group" recognized by the file, or can belong to "other". Each file contains a data portion that specifies the file characteristics, such as ownership, information access capabilities relative to the three types of users, etc. The owner of the file can change all file characteristics.

Architecturally, the first and primary file is a root directory file. The user who is the owner of this directory is, in effect, the owner of the entire smart card. This user can create other file which are pointed-to by the root file. These files, which can be other "directory" files as well as "normal" files, are considered to be "below" the root directory, in a tree-like structure.

In many UNIX operating systems, one of the directories below the root is named "etc.", and it has a file below it that is designated "passwd". The full address, or path name, of that file is "/etc/passwd" (the file "/" at the beginning of the path name designates the root address). The "etc" and the "passwd" files are owned by the system administrator, typically called "Root", who is the also the owner of the root directory. The "passwd" file contains an encrypted representation of Root's password, and Root's access to the operating system is allowed only after Root logs in by providing the password. The presented password is encrypted and compared to the encrypted password stored in the "passwd" file. When the comparison is favorable, the user is accepted and granted permission to access other files; i.e., the user is "logged in".

Multi-user capability is provided by allowing Root to create a subdirectory below the root directory (or a subdirectory below root) and to assign ownership of that subdirectory to another user. Root can then install a password for that user in the "passwd" file and allow the user to enter the system at that subdirectory file when that user presents his/her password. The user has the ability to modify his/her own password, but only through a command provided by the operating system. That password resides in the system only in encrypted form and only in the "passwd" file. This architecture is depicted in FIG. 1.

The log-in process can be summarized as follows. A computer operating under the UNIX operating system begins by executing a loop that scans the computer's input port. When connection by a user is detected, control is transferred from the loop to a program that begins interactions with the user. The program sends a "login:" message to the user and waits for the user's response. The user identifies himself/herself (for example, by returning the string "htb") and that identifies the user to the operating system. The program then continues with the challenge message "Password:" and the user must supply a password string. The program encrypts the password string and compares it to the encrypted password that is found in the "/etc/passwd" file for the identified user. When the match is positive it is determined that the user is bona fide, and control passes to a file owned by Root (typically named ".profile"). That file sets various parameters for the user and passes control to another file that is owned by the user (typically also named ".profile", but this file is located in the directory owned by that user). Whatever instructions are found in the user's ".profile" file are executed and then the computer is placed in another loop, awaiting further instructions from the user.

Root is the owner of all files that comprise the operating system, as well as of the "passwd" file. Therefore, Root can modify any and all files and is, therefore, a "super user". It is important to note that even files that are not owned by Root are nevertheless subject to Root's commands. Giving Root effective ownership of all files, even where the files are officially owned by another user, makes perfect sense because Root has the power to change the "passwd" file as well as the files that control Root's capabilities generally. The latter gives Root has the power to change the password itself and, therefore, Root can always make itself the owner of a file. Hence, it makes sense to let Root have all the powers of an owner directly. In short, Root has absolute control and total knowledge over all files in the system.

Aside from being able to log in (by providing the correct password), users are granted the ability to read files, write into files, and execute files—i.e., pass program control to files. Without the power to pass program control to a specified file nothing can be done, for executing a program is noting more than passing control to a file. Since Root has access to all files in the system, it follows that Root can read, write, and execute all riles.

All instructions in the UNIX operating system are merely files that can be executed, and those files can be located in any directory—as long as the system knows where those files are found. Root owns all those directories and those files. Since Root controls the read and execute permissions of all those directories and files, it follows that Root can restrict anyone (including itself, if that were desired) from executing any file, and that gives Root the power to create customized sets of files whose execution is prevented by particular groups of users. In other words, Root can create various restricted operating systems, or "restricted shells", that encompass less than all of the commands available on the system.

The Smart Card Operating System

The absolute power that Root has in the UNIX operating system makes it unsuitable for smart cards. While it is patently clear that providers such as Visa, MasterCard, and American Express will not allow each other to be the Root, it is also quite likely that, absent demonstrably sufficient security means, they would not want anyone else to be the Root either. This factor prevents the smart card from enjoying increased commercial success.

Figure 2:
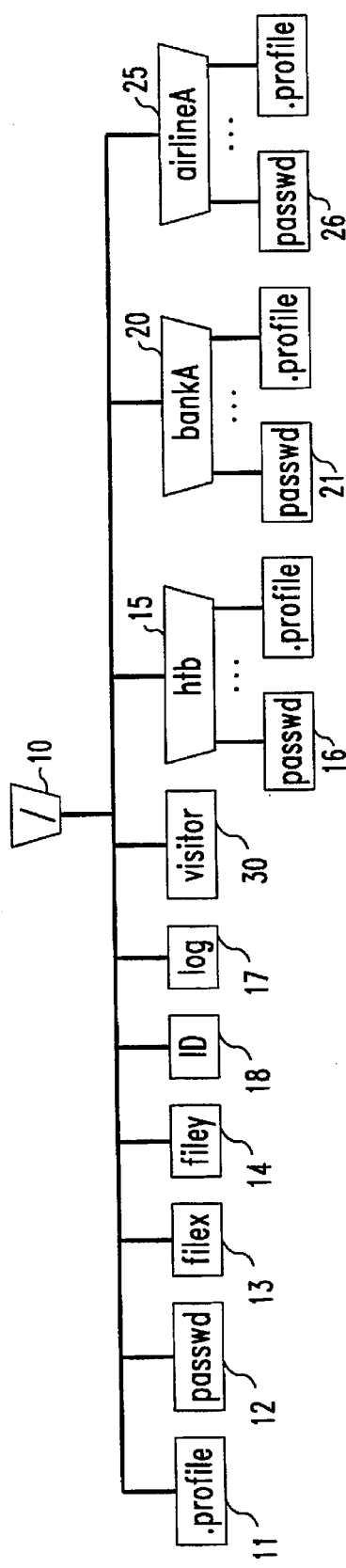
FIG. 2 presents the tree structure of a smart card operating system.

FIG. 2 illustrates a structure that responds to this sensitivity of service providers. According to the structure of FIG. 2, Root owns the root directory and any number of files (directory files or normal files) that it wishes to create. For example, FIG. 2 includes a root directory file 10 and below it there are ".profile" file 11, "passwd" file 12, "log" file 17, "filex" file 13, "filey" file 14, and "ID" file 18. A number of subdirectories are also found below root, with each being used as the "HOME" directory of a user (service provider), and also creates a password file for each such user HOME directory. For example, FIG. 2 includes a directory file 15, named "htb" (the smart card's Holder), a directory file 20 named "bankA", and a directory file 25 named "airlineA". Each one of the directories includes a "passwd" file (16, 21, and 26, respectively) below the associated user's HOME directory, as well as a ".profile" file. This placing of the password files has some advantages but it is not a requirement. Importantly, ownership of each such password files is assigned to the user associated with that file and the directory above it. It may also be advantageous to grant ownership of files (directories) 15, 20 and 25 to the respective users.

FIG. 2 includes one additional important directory (and a user). That is the "Visitor" directory 30, which is the entry point for non-service providers who wish to interact with the smart card.

The FIG. 2 file architecture is coupled to an operating system that differs from that of the UNIX operating system primarily in that the operating system of the FIG. 2 structure does not allow Root the ability to modify files that it does not own. To insure that this capability is not circumvented by Root, the operating system does not allow Root to modify some of the files that define the operating system (in a sense, Root does not own those files). One means for achieving the latter result is to encase those (non-Root-owned operating system) files in a read-only memory (ROM). At the very least, the ROM contains the commands/modules/files that effect writing (over-writing or appending) to a file. More specifically, the writing to a file is restricted to whatever the owner of the file specifies (the owner of a file is, initially, the user that creates the file), and Root is treated as merely another user. Commands that effect writing to a file are operating system commands that, for example, move files, copy files, save files, change file attributes (e.g., ownership), and rename files. Other items that may be installed in the ROM, or more typically in a "write once" memory (because they are unique to each smart card), are the Root password and the smart card's ID information (i.e., files 12 and 18). The ID information may simply be an arbitrary string, or it may include the Holder's name (the latter is probably referred by merchants who will get the ID information). Actually, both the Root password and the smart card's PIN can be encased in the file that establishes the Root directory. In FIG. 2 these are independent files for illustrative purposes.

In some embodiments of the smart card operating system, one file-writing power is granted to Root and that is the power to delete any file in its entirely (and in the process, effectively deleting any file that the deleted file points to). This includes directory files and normal files and it applies to files that Root owns and to files that Root does not own. Such a capability may be given in embodiments where memory space is to be reused when a given service provider is no longer providing services to the smart card's Holder.

Another difference between the operating system of FIG. 2 and that of a standard UNIX operating system is that the former includes an encryption key pair that is installed in a file owned by Root (e.g., in "filex" 13), and that key pair is unique to each smart card. The pair includes a private key, f, that is kept secret by the smart card, and a public key, g, that the smart card does not care to keep secret. Of course, both keys are initially known to the smart card's owner/issuer, who is also the Root user (i.e., super user) of the smart card, but Root need not keep the private key (and probably would choose to destroy that knowledge). This pair of keys can also be "burned" into an appropriate memory, such as the memory containing Root's password, or included in the file that defines the root directory. More about public key encryption is found below.

The fact that the password of a user's directory is stored in a file that is owned by the user is a key difference between the UNIX operating system and the operating system shown in FIG. 2. Combined with the restriction on writing, this organization prevents Root from becoming the owner of any file (normal file or directory file), and thus prevents Root from circumventing the permissions set by the file's owner. This key difference allows one user's files to be completely opaque to Root as well as to other users that have access to the smart card. Thus, the FIG. 2 arrangement overcomes the "trust issue" between the providers of services and the smart card's issuer/owner.

Transactional Security

The next issue that must be addressed is transactional security of the smart card. This concept encompasses the measures employed by the smart card's operating system and by the agreed upon communication protocols to ensure that unauthorized transactions which would adversely affect the Holder or any of the service providers do not occur. This includes activities by Root, the Holder, any of the service providers, any Visitor user, or an interloper. (An interloper is a party that interjects itself into a communication session between a smart card and another party and substitutes its messages for the true messages.)

One way to thwart interlopers is to construct messages that include a date and time stamp, with at least that portion of the message being encrypted. Alternatively, the entire message can be encrypted. Also, wherever necessary, the communication protocol can require a confirmation sequence (which differs from session to session) to be exchanged between the parties. It is also a good general approach to minimize the flow of sensitive information in the clear (i.e., without encryption), such as passwords. These techniques are employed in the log-in and communication protocols described below.

Encryption

The field of encryption is not new. What follows is merely a summary of two encryption techniques that may be employed in connection with the smart card disclosed herein.

As is well known, the "shared secret" approach to encryption calls for the two communicating parties to share a secret function, f. The party wishing to transmit a message, m, encrypts the message with the secret function to form an encrypted message $f(m)$. The encrypted message is transmitted and the receiving party decrypts the received signal by forming the function $f(f(m))$. The function f is such that discovering the message m from $f(m)$ is computationally very difficult, but applying the function twice recovers the original message; i.e., $f(f(m))=m$.

The "shared secret" approach to encryption is very good, but its weak link lies in the need to communicate, i.e., or share, the secret function. If an eavesdropper obtains the shared secret during that singular communication session when the function is transmitted, then it is no longer secret.

In public key encryption, each party maintains one member of a pair of keys, f and g. That is, one party keeps one key (f) secret and never communicates it, but makes the other key (g) known to all, including the other party (thus, the key g is "public"). The pair, f and g, is such that 1. $g(f(m))=m$,
2. even when g is known the function f cannot be determined, and
3. it is computationally infeasible to determine the message m from $f(m)$.

Whereas the public key approach solves the key distribution/administration problem described above, it does have a disadvantage and that is that public key encryption and decryption is slower (requires more computation time) than the shared secret approach.

As it relates to smart cards, speed of communication has different levels of importance, based on the kind of party that is communicating with the smart card. With respect to the smart card's issuer/owner and the service providers, low speed is not a major disadvantage because it is expected that such communication will be rare and, therefore, processing time is not "of the essence". In communication with others, however, (i.e., merchants that log in as the Visitor user), speed is important.

The speed issue is resolved, where necessary, by combining the "shared secret" approach with the public key approach. That is, when communication is initiated, the public key approach is used to communicate a temporary "shared secret" between the smart card and the merchant. Specifically, the party having the public key suggests a "shared secret" and communicates it to the party having the private key. Thereafter, the faster, "shared secret", approach is used to encrypt the entire messages.

Alternatively, a certification approach may be used (using the shared secret). In a certification approach, the message is sent in the clear, and is appended, or "signed", with a "digital signature". A "digital signature" is a hashing of the message (e.g., adding the ASCII codes of the characters in the message, in a selected modulus) that is encoded. Of course, in applications where it is assured that an interloper cannot substitute the true data with false data, the information can be sent in the clear (probably following a verification process using the public key).

Use of the public key approach solves most of the key-administrations concerns. It still leaves the question of the initial knowledge of the public key by the party wishing to communicate with the smart card, but that is not a problem since the smart card itself can provide that information.

Log-in by Root and Installation of a Service Provider/User

Because encryption ensures secure communication, the smart card's issuer/owner can have confidence in remote installation of services. Of course, the issuer/owner (i.e., Root) must first log in into the smart card. A protocol for the log-in is presented in FIG. 3, and a protocol for service installation process is presented in FIG. 4.

Figure 3:
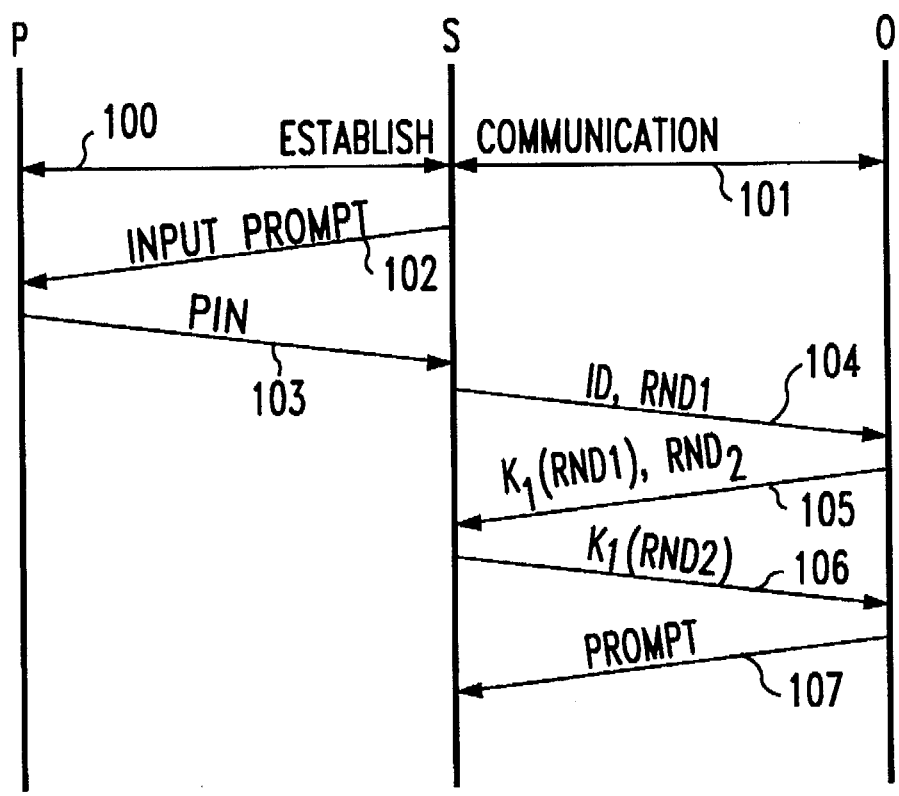
FIG. 3 shows a log-in protocol between a smart card and its issuer/owner.

As depicted in FIG. 3, the process begins with the smart card's possessor (P) being authenticated as the bona fide Holder (H) of the smart card (S). This approach is particularly useful in embodiments where it is desired to not communicate the Possessor's PIN (Personal Identification Number) string to any equipment that might capture the PIN. For example, in applications where P and S are at a merchant's premises, it is possible for the merchant to have a stand-alone piece of equipment that is battery operated, has a keyboard input means, a display output means, and is certified to include no other ports and no writeable memory. In operation, P would insert S into this stand-alone equipment, input the PIN via the keyboard, and the equipment's display will output the message "OK", if appropriate. This will give Holders the additional sense of security that the equipment used for the transaction will not capture their PIN string for some future unlawful use. When such stand-alone equipment is unavailable (or when the communication is remote as, for example, when a "dumb" card reader is used at the possessor's home), the submitted PIN should be processed in the card and the "OK" message from the smart card should be "time stamped" and encrypted. This suggests that the P's confirmation as H must be postponed until after the appropriate encryption keys are established and date and time information is imparted to S.

Returning to FIG. 3, after the bona fide status of H is established, S identifies itself and verifies that the user logging is a valid user. More specifically, the protocol of FIG. 3 proceeds as follows:

a. S prompts for an input, and P provides a PIN string. Within the smart card the PIN resides in a Root-owned file that is open for the Holder to modify (say, file 14 in FIG. 2). S compares the provided PIN string to the stored PIN string, and if the comparison is positive, then P is confirmed as H.

b. Once H is confirmed, attention can turn to the communication between S and 0. S identified itself by providing to 0 its ID number and a password challenge in the form of a random string, RND1.

c. 0 encrypts RND1 with O's password to form string $K_1(RND1)$ and returns it to S. This form of password response obviously changes from session to session and ensures that the true password of 0 is not snared by an interloper. There does remain the question of where 0 keeps the passwords of all the smart cards that it owns, and how secure such a database is. However, there is actually no need for 0 to keep a database of passwords. All that 0 needs is a single seed string which, when combined with the smart card's unique identification string that is part of the ID information submitted by S (or derived from a database based on the ID information, if the identification string is not sent by the smart card) yields, when transformed, the password assigned to the smart card.

d. Since the string submitted by the smart card will always be either the same or unknown to 0 beforehand, an additional authentication step may be desired to ensure that the initial string (ID, RND1) is not a replay of a recording. This is achieved by 0 sending a challenge message to S comprising, for example, its ID and a random string RND2. This string can be sent after S has logged 0 in, or it could be sent (as shown in FIG. 3) together with the password response. S encrypts RND2 with S's Root password and forwards the resultant string, $K_1(RND2)$, to 0.

e. Based on the ID contained in the RND2 string, S determines that 0 is the user, obtains the necessary key (i.e., O's password), and decrypts $K_1(RND1)$. When the decryption results in RND1, S determines that 0 is bona fide.

f. Thereafter, S encrypts the string RND2 with S' root password and forwards the resultant string, $K_1(RND2)$ to 0.

g. 0 decrypts the $K_1(RND2)$ response, and if the resulting string is RND2 then 0 is satisfied that S is valid. This ends the log-in process, with 0 presenting a prompt to S and standing ready to accept requests for service.

It may be noted that the "log-in" process described above appears to be different from the familiar log-in process where the computer into which access is desired controls the entire log-in process. In this familiar log-in process, the computer asks for an initial identification of the user, and then asks for a password. Based on that initial identification, the computer knows what password to expect. Here, the smart card appears to be in control, in the sense that it initiates the communication (with 0); but instead of asking for an initial identification—to get information—it provides the information in the form of ID and RND1. That raises the question of whether the response from 0 is the initial identification, or the password; and if it is the password, then how does S know whether the password is correct. The answer is that the response from 0 serves three purposes: it identifies itself in the sense of the initial identification (by the ID contained in RND1), it authenticates itself by using the correct key to encrypt RND1, and it challenges S by RND2 to be returned in an encrypted mode.

Figure 4:
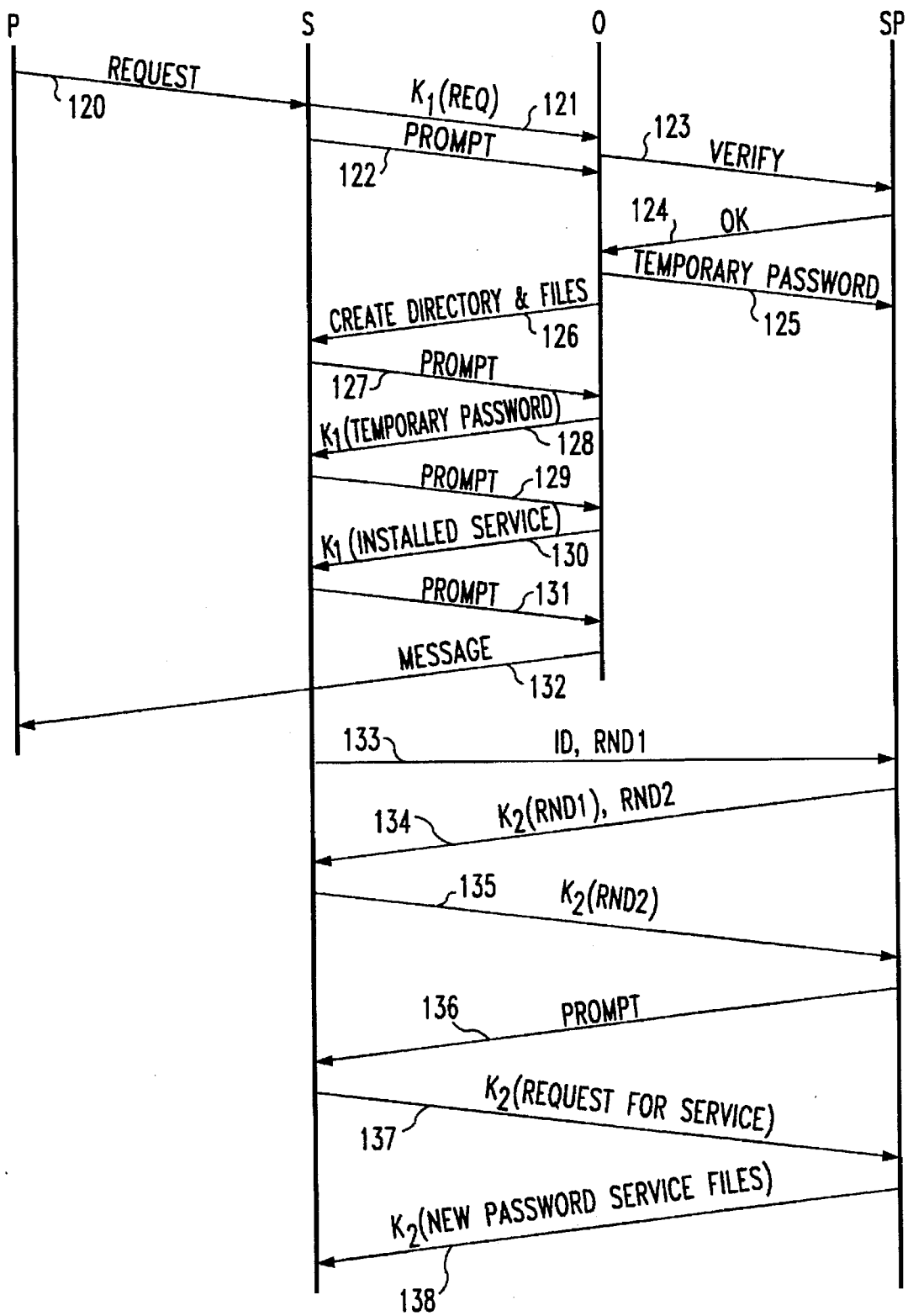
FIG. 4 illustrates a protocol involving a smart card, the issuer/owner and a service provider.
Figure 5:
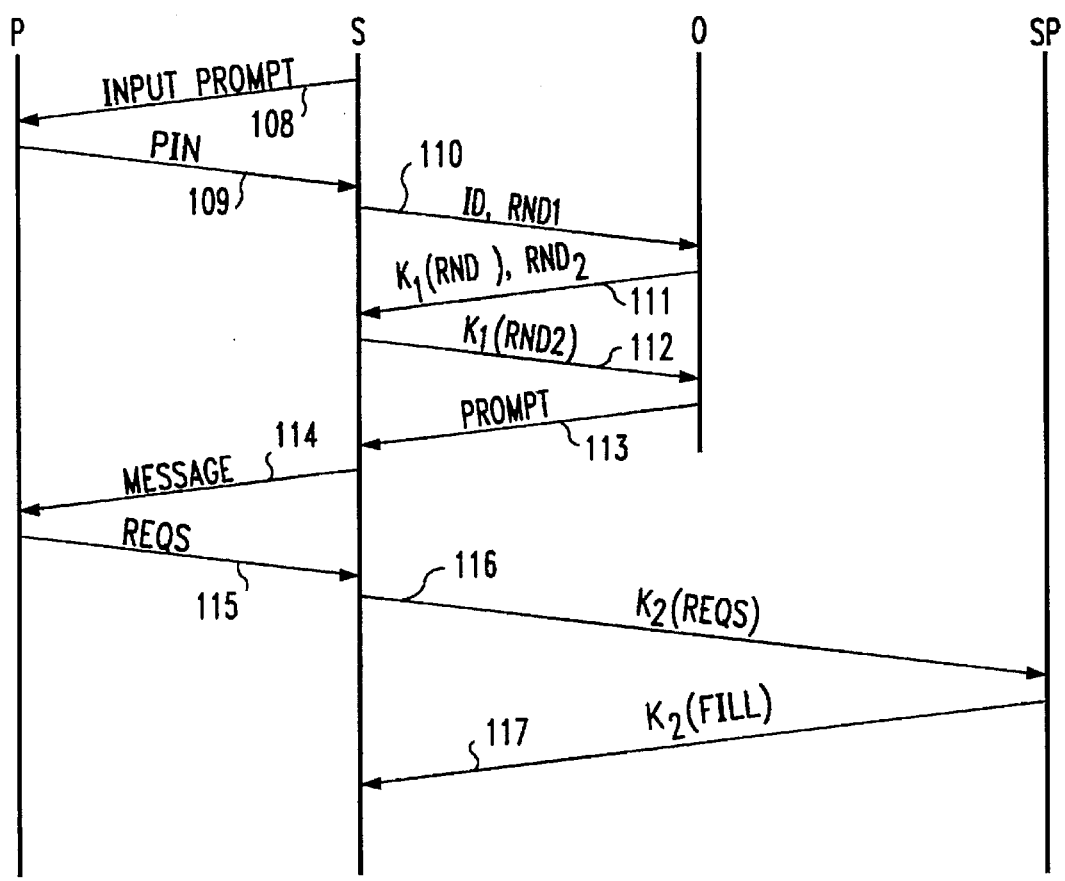
FIG. 5 presents a protocol for a smart card obtaining services from a service provider.
Figure 6:
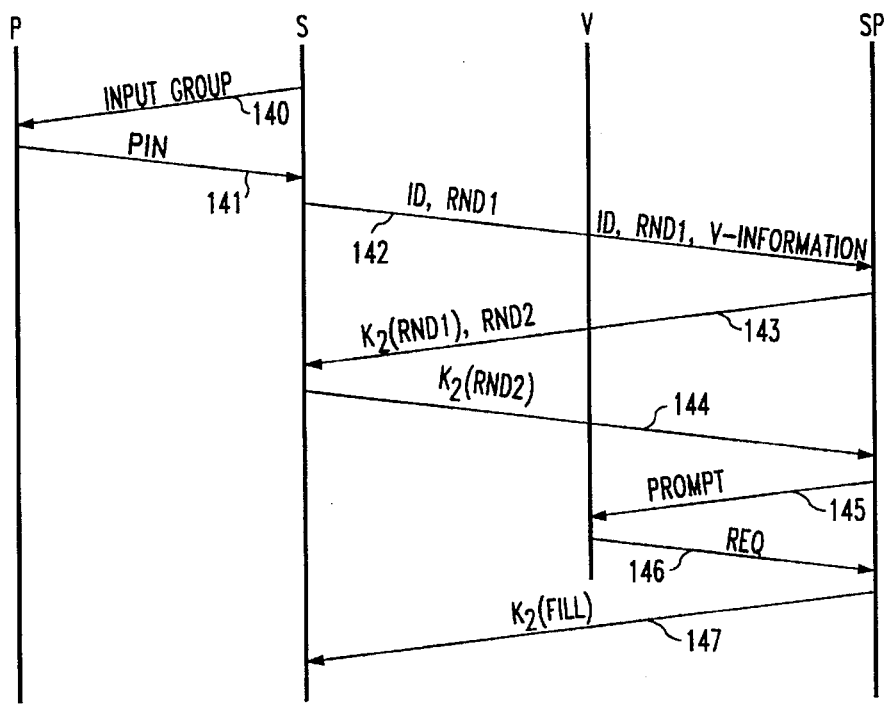
FIG. 6 presents a protocol involving a smart card, a Visitor user and a service provider.
Figure 7:
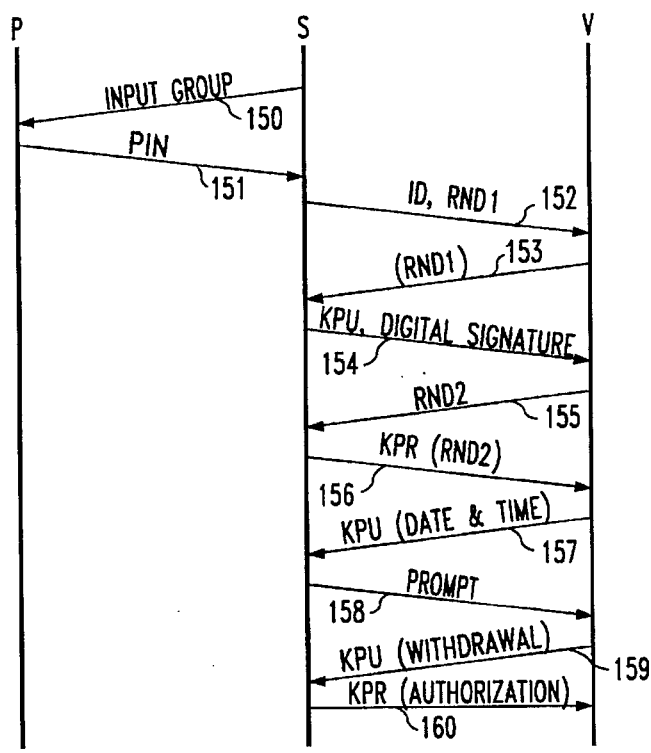
FIG. 7 presents a protocol between a smart card and a Visitor user, without connection to a service provider.

Once 0 is logged in, H can communicate a request for installation of a service offered by a service provider (SP). The communication regarding the particular service requested to be installed by 0 may involve interaction with a human, but it can also be automated. For example, H can communicate to S the service that is desired, and S communicates with 0. FIG. 4 presents a protocol for installation of service.

a. H forwards a service request to S.

b. S encrypts the request and forwards it to 0. The electronic communication between 0 and S can be encrypted with the private key member of the public key within S, with S sending its public key to 0. Alternatively, the communication can be encrypted with a "shared secret" of the smart card. The Root password may be selected for the latter, or a temporary "shared secret" can be offered by 0 to S (using public key encryption, as described above). In FIG. 4, the Root password is used for encryption, creating the request string $K_1(REQ)$.

c. Knowing the desired service, 0 contacts SP to verify that SP consents to offer a service to H.

d. If provision of service is agreeable to SP, 0 selects a temporary password, informs SP of that password (probably through encrypted communication), and proceeds to create in S a directory and a password file for SP.

e. When the password file is set up for the SP user, the temporary password is sent to S (communicated in encrypted manner, as described above) and ownership of the directory and the password file is transferred to SP (his password can serve as the "shared secret" key in future communication sessions with SP). Also, the rest of the application software that SP requires can be installed at this time, with 0 transmitting those files in encrypted mode. Alternatively, it may be arranged that no application software is installed by 0.

f. At this point H is informed to contact SP for a final set-up.

g. H sets up a communication path between S and SP, employing a log-in sequence as shown in FIG. 3 But using the temporary SP password as the encryption key.

h. Once the log-in to SP is established, S sends out a request for service, and SP responds by installing a new password, whatever files are necessary which were not installed by 0, and data. This completes the service installation.

Provision of Service by a Service Provider

As indicated above, a service provider is simply a user having an assigned directory in the smart card. The service provider logs in when a possessor (P) of a smart card establishes communication between the smart card and the service provider. As before, there are three elements to the log in protocol:

(1) SP wishes to establish that P is H, (2) S wishes to determine that the logged in user is the true SP, and (3) SP wishes to determine that it is communicating with a valid S.

These three elements are carried out in the protocol disclosed in connection with FIG. 3. Only after a successful log-in, can a service request be advanced. A service request may be, for example, H requesting SP (who happens to be a bank) to install "money" into S, filling the "electronic purse" of S. The filling of the electronic purse may simply be installing a value in a file owned by SP.

Interaction with Merchants

It is expected that, by a wide margin, the smart card holder will wish to have the smart card interact with merchants who are Visitor (V) users. The arrangement disclosed above permits such interaction in two ways: direct interaction between the smart card and a merchant, and a three-way interaction involving the smart card, the merchant, and the service provider. The protocol for the latter approach, shown in FIG. 6, may be as follows:

a. P sets up communication between S and V (by handing S to V or by remotely connecting S to V).

b. S prompts for an input and P provides the PIN string. When that checks out, S determines the P is H and proceeds with the standard "log-in" sequence, sending its ID information and RND1.

c. V sets up a communication path with SP, identifies itself to SP, relays in the ID information and RND1.

d. Given the ID information, SP determines its password and encrypts RND1 with that password. The resulting string, $K_2(RND1)$, is sent to S, together with a random string RND2.

e. S determines whether SP used the correct password in forming $K_2(RND1)$ and, if the conclusion is positive, encrypts RND2 and forward the result, $K_2(RND2)$, to SP.

f. When SP confirms that S used the correct password to encrypt RND2, it sends a prompt to V to inform the merchant that the it can proceed to request usage of S.

g. V requests action from SP (such as deleting a value from H's account with SP, or such as modifying a value in a file residing in S and owned by SP).

h. SP fills that request and, if necessary, sends an appropriate command to S, encrypted with the SP password.

When it is desired to have the smart card interact directly with the merchant (or a merchant in concert with the merchant's bank, or some other entity that provides a service to the merchant and stands "in the shoes" of the merchant) a mechanism needs to be established for allowing parties who do not have a pre-established relationship with the smart card to log in into the smart card. The "Visitor" user directory serves that need, and that user has no password. Consequently, the Visitor user is a very non-secured user, so V's access must be strictly controlled.

One question that needs to be answered, for example, is whether such a Visitor user will have access to application files (programs) of only the service provider specified by the merchant, or to application files of all service providers. If access is to be granted to application files of all service providers, then the simplest arrangement is for Root to establish a Visitor user directory with no password and with a restricted shell which allows the Visitor user to execute only a limited set of operating system commands; i.e., with the variable PATH set up to contain one directory owned by Root (which includes only few operating system commands), and the SP directories (or chosen subdirectories of the service providers/users) which include the executables to which the SPs wish to grant execution access to Visitor users.

If access is to be granted to application files of only a specified SP then, of course, that SP must be specified and means must be provided to include only the executables of the specified SP. Again, that is easily accomplished with a restricted shell, where the PATH variable includes the directory (or chosen subdirectory) of the specified SP. The protocol, depicted in FIG. 7, may be as follows:

a. S prompts for an input and P provides the PIN string. When that checks out, S determines the P is H and proceeds with the standard "log-in" sequence, sending its ID information and RND1.

b. Since V does not have any passwords, it merely returns the string RND1.

c. By this response S recognizes that the user is a Visitor user and sends out its public key, $K_{pu}$. (The public key could have been sent as part of the ID information.) At this point S can also send a "digital signature" that is derived from a message that contains the public key, the ID information and RND1. S can also send an encrypted string that constitutes a proposed "shared secret" (not shown in FIG. 7). Both the proposed "shared secret" and the digital signature are encrypted with the public key.

d. M deciphers the "digital signature", using the provided public key. If the deciphered "digital signature" matches the appropriate string then V sends out RND2.

e. S encrypts RND2 with its private key and responds with $K_{pr}$(RND2).

f. V decrypts this message with $K_{pu}$ and if obtains RND2 then it is satisfied that it is communicating with S.

g. V sends time and date information to S, encrypted with $K_{pu}$, and S returns a prompt.

h. V transmits a request to S (identifying the action V seeks and the SP that is to be employed), also encrypted with $K_{pu}$, and S responds with an authorization to contact the specified SP. The authorization is encrypted with the private key, $K_{pr}$.

Typically, the merchant wants to get some funds that belong to H, in exchange for goods or services provided by the merchant. As described above, it is quite possible for a service provider, such as a bank, to install an "electronic purse" that will hold a value. This value is in a file, termed the electronic purse file, which is owned by the service provider.

The merchant wants access to the electronic purse file, and the SP (in concert with H) is willing to grant access to this file, but only in a very limited and strictly controlled way. Thus, this file is accessible to all logged-in users, but only through a command installed by SP and owned by SP. This command grants temporary permission to other users to deduct a sum from the value found in the file (providing it does not create a negative result). This command also records the transaction in the log file and provides the authorization string shown encrypted in FIG. 7. Thus, SP creates an electronic purse file with a prescribed name that is expected by the operating system, populates the file with a value and a specific operating system command (that is not owned by root), accesses the file and deducts a sum from the value found in the file.

The authorization string is shown encrypted with the private key of S, but it can also be encrypted with the specified SP password. The string must be robust enough to ensure that the merchant does not merely duplicate it a number of times and send the response to SP. This can be accomplished in a number of ways, including having the date and time stamp, an indication of the "before" and "after" values in the "electronic purse", a sequence number supplied by S, etc. Since this authorization string is not decipherable by V and hence unalterable, security is maintained.

Figure 8:
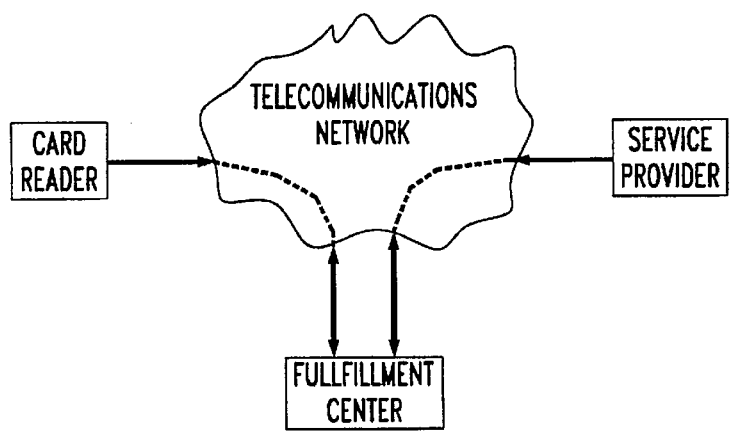
FIG. 8 depicts an arrangement for remote provisioning of smart cards using the telecommunication network.
Figure 9:
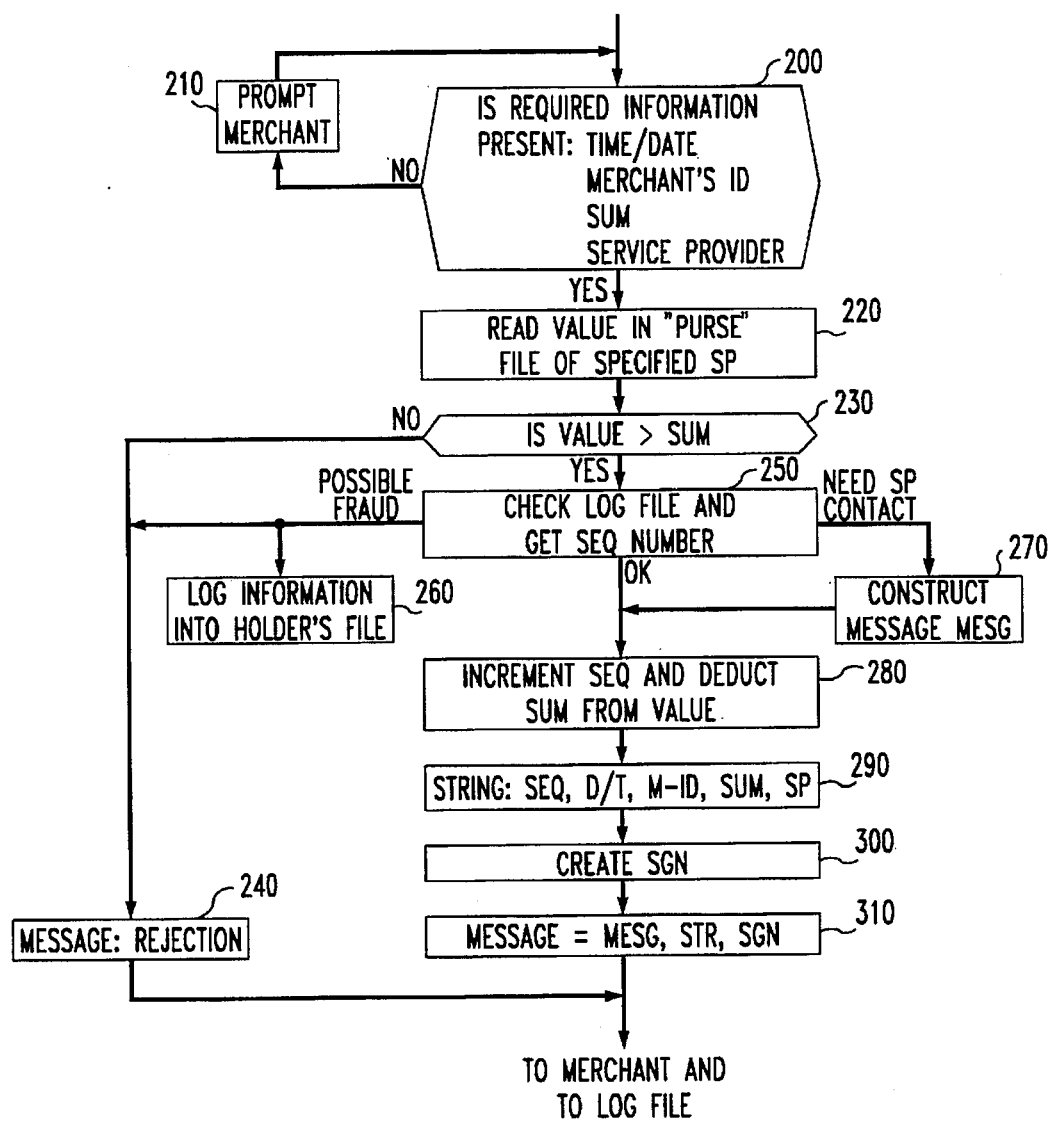
FIG. 9 presents a flowchart of an operating system command for drawing upon a value stored in a service provider's file.

With respect to the aforementioned operating system command, a flowchart of such a command is illustrated in FIG. 8. The command starts at block 200 by perusing through a file (of a prescribed name) in the Visitor user directory. The file must contain four entries, separated, for example, by a newline character, and the operating system assumes that the four entries comprise a) date and time, b) merchant's ID, such as name, address, and perhaps a code, c) the sum of money that is to be deducted, and d) the service provider whose "electronic purse" is to be used.

When that file does not exist or doesn't have the required number or entries, control passes to block 210 which informs the merchant (Visitor user) of the deficiency. When the file does exist, the command reads the value in the electronic purse file of the service provider (SP) in block 220. This file is a file that has a prescribed name. Block 230 evaluates whether the sum that the merchant wishes to withdraw is greater than the value in the electronic purse. If it is, control passes to block 240 which constructs a rejection message and forwards it to the merchant and to the log file within the smart card. When the sum is lower than the value, control passes to block 250 which checks the log file for various indicia of fraud. This may be a separate command that is called by the command being executed. As depicted in FIG. 3, block 250 can result in three types of outputs: a first output that suggests a potential fraud condition (e.g., this merchant has used the smart card more than a prescribed number of times within a preselected time interval, or the data and time given by the merchant is earlier than the latest time found in the log file, etc.); a second output that responds to a threshold file provided by the SP which directs the merchant to conference the SP to the transaction; and a third output that indicates a normal condition.

The potential fraud condition is handled by information being stored in the Holder's log file (block 260), and control then passes to block 240. The information stored identifies the merchant, what was attempted to be withdrawn, the reason for the rejection, etc. This provides the Holder with the information necessary to interact with the issuer/owner of the card and with government authorities, as necessary. If desired, the smart card is disabled when a fraud condition is suspected.

When a threshold set by SP is exceeded (e.g., SP desires withdrawal authorizations in excess of $1,000 to be granted "in real time"), a message is constructed in block 270 and control passes to block 280.

Block 280 is also arrived at directly from block 250 when a normal condition is indicated. Block 280 increments the sequence number found in the smart card's log file and deducts the sum desired by the merchant from the amount in the value file. Thereafter, block 290 creates a string that comprises the new sequence number, the date and time, the merchant's identification information, the sum, and the SP. Block 300 creates a digital signature of the string and block 310 creates a message that comprises the message constructed in block 220, the string constructed in block 300, and the digital signature. Finally, that message is sent to the merchant and to the smart card's log file.

The merchant's equipment will do one of two things. When a message to conference SP is found to be present, the merchant's equipment connects itself to SP and forwards the message created in block 310. The merchant can then get immediate credit for the sum (provided, of course, that based on the signature the message is concluded to be valid). When the message received by the merchant does not include a message constructed by block 220, then the merchant can simply store the authorization string, collect such authorization strings over a chosen time interval (for example, the entire work day), and then forward the authorization strings to the appropriate SPs.

The authorization string is shown encrypted with the private key of S, but it can also be encrypted with the password of the specified SP. The authorization string must be robust enough to ensure that the merchant does not merely duplicate it a number of times and send it to SP. This can be accomplished in a number of ways, including having the data and time stamp, having an indication of the "before" and "after" values in the value file, having a sequence number supplied by S, etc. Since this authorization string is not decipherable by V and hence unalterable, security is maintained.

Smart Card Issuer/Owner as a Service Center

One aspect of the arrangement disclosed herein is that the smart card's issuer/owner (O) has a general knowledge of, and control over, the service providers whose "applications" are present on the smart card. First, O controls the establishment of a service provider's directory. Second, O can delete any directory at the holder's request, or whenever O gains access the smart card (with, or without, the holder's consent). Third, O is the only party who knows the identity of all the service providers who share the smart card, and various particulars about those service providers. Fourth, through the operating system's design, O can control the amount of memory that each service provider has access to, and thus can control the number of service providers that can "coexist" on a smart card. Fifth, O can define a service providers grouping for particular types of transaction. Sixth, O can charge each such service provider for the privilege of being on the smart card in proportion to the space occupied by the service provider.

As can be appreciated from all of the above, a number of benefits accrue from this arrangement. One, for example, is that none of the service providers is privy to the knowledge of what other services the holder has access to. Another is that it is a disinterested party, namely O, that has the power to remove any and all directories. This party also has the power to "fix" a defective card and reinstall all of the services on it (typical power of an owner). Conversely, it has the power to delete all directories, and this power will be exercised when it is determined that the smart card is stolen.

With regard to security, there are four forms of attack that need to be considered: one is when an interloper tries to become Root, another when the interloper tries to become a service provider, a third when a party (Root, a service provider, and interloper, a Visitor, or the Holder) tries to do more than is permitted, and a fourth when the possessor is not the bona fide Holder.

With respect to the first form of attack, it is the Root password which is the first and primary sentry. It is an effective sentry in that the operating system is set up to completely disable the smart card when a log-in as Root is attempted but fails. For example, all directories can be erased.

An attempt to log in as a service provider should be handled only in a slightly more forgiving way. Thus, it can be arranged for a counter to keep track of failed attempts to log in as a service provider. When the number of failed attempt exceeds a preselected value (for example, 4) the smart card again disables itself. In such situations it may be desired to direct the smart card disablement only to the directory of the service provider who was the object of the attack, or to all of the service provider directories but not to the Root directory.

The most numerous contacts with the smart card will be by Visitor users. While these contacts need to be flexible, they also need to be vigilant. Whereas in the UNIX operating system a command that is not found in the PATH results in a benign message to that effect, the smart card needs to monitor these attempts to access impermissible commands. Again, a counter can be employed and when a preselected count is exceeded, communication with the Visitor can be terminated, a message stored in the smart card, and the card disabled to everyone except the Holder. The message, which would be stored in the holder's directory, would comprise the particulars of the aborted transaction.

Another security measure might even involve valid transactions by the Visitor. As described above, one of the files owned by Root is a log file, which maintains a record of all transactions carried out by the smart card. This file can be checked to disallow a particular Visitor user, or all Visitor users, when particular circumstances appear to be present, such as too many transactions by one visitor in a given time interval, too many transactions in a given time interval, etc.

A slightly different security problem manifests itself when the parties making contact with the smart card are OK, but it is the possessor of the card who is the problem. Here, it can easily be assumed that the parties interacting the smart card would like to cooperate in the prevention of the smart card's use; at that point, and henceforth. This can be accomplished in a number of ways. When, during the log-in sequence it is determined that the ID provided by the possessor is wrong because, for example, the smart card is a stolen one, the merchant can execute a command that writes a message to a file belonging to Root and disables the card. The only way to recover the card, then, is to contact Root. When Root reads the message, a determination can be made whether the Possessor is in fact the true Holder or not, and proper action can be taken.

Alternatively, the merchant's equipment can connect the smart card to the card's issuer/owner. The owner first disables the smart card and then proceeds to interact with the smart card's possessor to determine whether the possessor has authority to possess the smart card. If the possessor does have that authority, the issuer/owner re-enables the smart card.

Service Center as a Repository of Smart Card Services

Given the above-disclosed structure and operating system of the smart card, it is clear the issuer/owner who installs all services found on the Smart Card has knowledge of those services. That is, although the issuer/owner does not have the power to delve into files owned by the various service providers (even though it is the Root owner of the Smart Card) the issuer/owner nevertheless knows of the specific service providers are resident on each of its smart cards. This knowledge can be maintained in a database owned by the issuer/owner (although each Smart Card can also maintain that information about itself).

In the event a Smart Card is lost or destroyed, a new Smart Card can be issued to Holder with all of the service providers installed. The only items that cannot be recovered are the data files created by the various users in the old file and the service providers' passwords. As with initial installations, a set of temporary password files can be installed. The service providers can then be contacted by the issue/owner to inform them of the temporary passwords, and the Holder then contact the service providers to modify the passwords and to populate the necessary files in their respective directories.

Audit Trail

As indicated above, Root can maintain a log file and store therein a record of each transaction. This file can then be used to keep tract of various thresholds that the Holder, or the service provider's may wish to impose.

Excessive uses of a smart card can be an indication of a fraudulent use. As indicated above, such uses can be detected through careful scrutiny of the log file and therefore stopped.

Another use of the log file, however, can be in connection with perfectly valid uses. For example, a credit-providing service provider may wish to be informed immediately whenever charges over a certain limit are incurred, while allowing "batch" transmissions from the merchants (perhaps at the end of the work day) for all smaller transaction. In connection with the "electronic purse" of the smart card, the Holder may instruct the smart card to automatically contact the Holder's bank when the money value in the smart card is below a certain limit, and transfer some additional funds into the smart card.

Still another use of the audit trail relates to dispute resolution. If a merchant asserts that the smart card was used to obtain some goods or services and the Holder disputes the assertion, the log file can be used to resolve the dispute.

Cooperation Between Service Providers

It is quite possible for service providers to form cooperative alliances. Such alliances can specify various activities which are carried out in the smart cards whenever the smart card is accessed, or when the smart card is accessed by a particular user. The number of such possibilities is limitless, and the example below is merely illustrative.

Assume, for example, that company A employs traveling salespeople who frequently need to purchase gasoline. A is likely to contract with O to issue a smart card for each of the salespeople (Holders) and request O to install A as a service provider and G as the gasoline provider. Sometime later, A may reach an agreement with bank B as a Provider of credit for the salespeople. That service can be remotely installed into all of the smart cards belonging to the salespeople by, for example, obtaining the cooperation of G.

Specifically, A can request G to install a request for communication with O whenever a smart card interacts with G and found to have A as a user but not B as a user. All that G needs to do is modify the file that is executed when H logs in to communicate with G and direct the smart card to call O.

Using the Smart Card Operating System in a Point-of-Sale Environment

Figure 10:
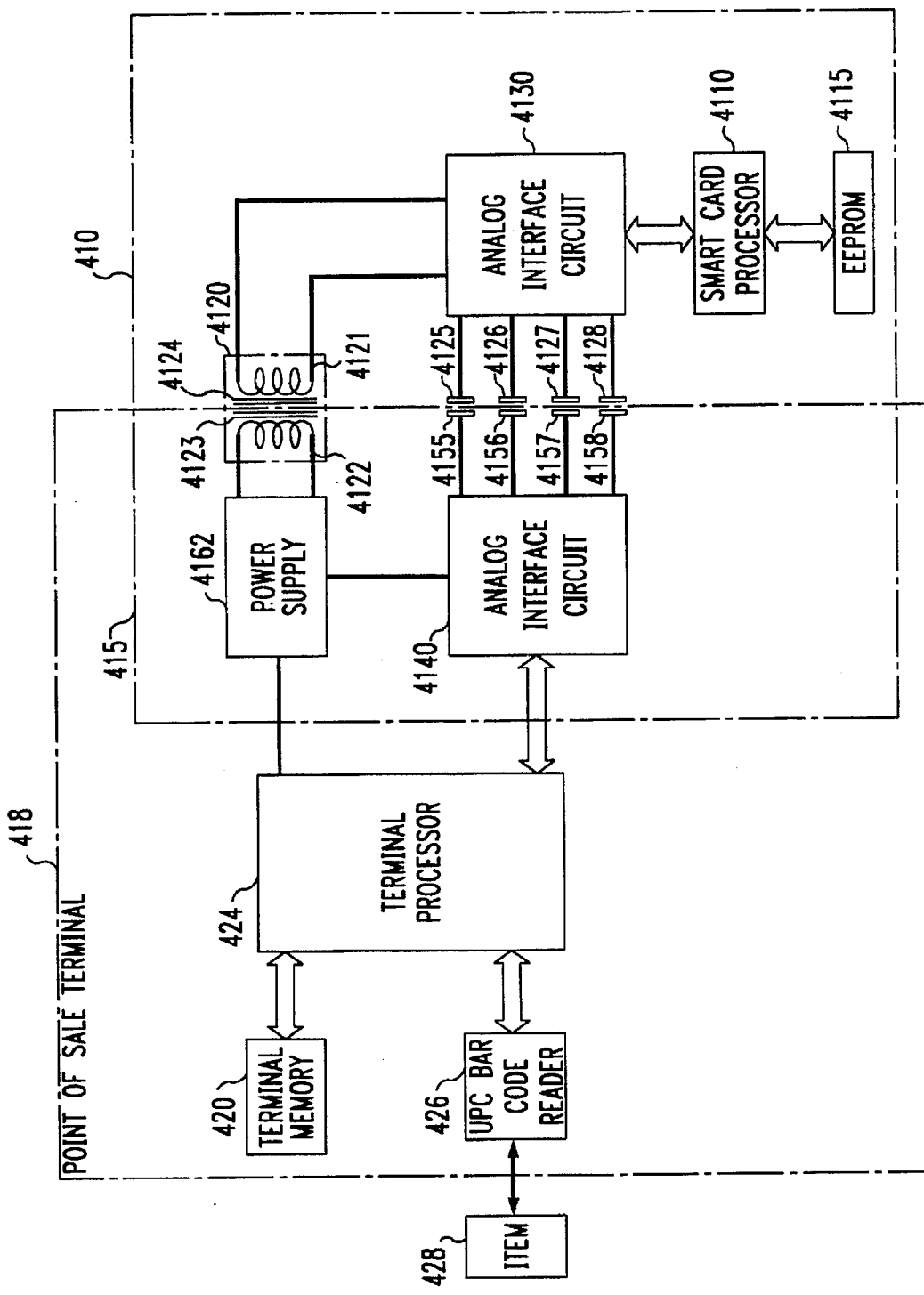
FIG. 10 is a hardware block diagram illustrating the features of a preferred embodiment of the invention.

With reference to FIG. 10, there is shown a smart card point-of-sale configuration which, for ease of understanding, may be divided into several subsystems. The first of these is a portable smart card 410 which contains a memory capable of storing and updating information for a user. The second subsystem is a smart card reader/writer 415 which links the card with a point-of-sale terminal 418, the third subsystem. This point-of-sale terminal 418 is a suitably configured application station which comprises a computer or dedicated workstation that runs application software necessary for accessing the memory in the smart card 410. The application software resides in a memory 420 of the point-of-sale terminal 418, and enables the retrieval and modification of information stored in the memory of the smart card 410. This memory 420 may be, for example, random-access memory (RAM), read-only memory (ROM), or the like.

The smart card 410 runs an executable operating system that is accessed via a set of operating system commands. These commands manipulate a file system on the card in accordance with rules required by card security, as described above in conjunction with FIGS. 2-9. The operating system may be implemented by application software which is executable on a point-of-sale terminal processor 424. Processor 424 may be a microprocessor device of a type well-known to those skilled in the art.

Some of the principle components located in the smart card 410 are a smart card processor 4110, an electrical erasable programmable read-only memory (EEPROM) 4115, an analog interface circuit 4130, a secondary winding 4121 of a transformer 4120, and capacitive plates 4125 through 4128.

The smart card processor 4110 includes a central processing unit and memory units in the form of random-access memory and read-only memory. A microcomputer available from Intel Corporation as Part No. 80C51 may be used for smart card processor 4110 with the proper programming. This programming is well-known to those skilled in the art. Operating under firmware control provided by its internal read-only memory, the smart card processor 4110 formats data that is transferred directly to the EEPROM 4115 and via the reader/writer 415 to the point-of-sale terminal 418. The entire EEPROM 415 or a portion of it may be an integral part of the smart card processor 4110, or it may be a separate element. The smart card processor 4110 also interprets the commands from the point-of-sale terminal 418 received through the reader/writer 415.

By employing EEPROM 4115 in the smart card 410, an authorized user has the ability to reprogram certain application files in the memory section of the card while at an authorized associated application station with new and different data as desired. EEPROM'S 4115 are available from a number of suppliers, many of whom are mentioned in an article entitled "Are EEPROMS Finally Ready To Take Off?" by J. Robert Lineback, Electronics, Vol. 59, No. 7 (Feb. 17, 1986), pp. 40–41. Data may be written to and read or erased from an EEPROM repeatedly while operating power is being applied. When operating power is removed, any changes made to the data in the EEPROM remain and are retrievable whenever the smart card 10 is again powered.

The analog interface circuit 4130 provides a means for interfacing the smart card 410 to the reader/writer 415. This interface performs a multitude of functions, including providing operating power from magnetic energy coupled from the reader/writer 415 to the smart card 410, and also coupling data between the reader/writer 415 and the smart card processor 4110 in the smart card 410. Power for operating the smart card 410 is provided to the analog interface circuit 4130 via an inductive interface provided by the secondary winding 4121 of a transformer 4120. This transformer is formed when this secondary winding in the smart card 410 is placed in close physical proximity to a primary winding 4122 in the reader/writer 415. The point-of-sale terminal 418 provides the source of power for operation of both the reader/writer 415 and the smart card 4 10.

The transformer 4120 may advantageously include a ferrite core 4123 in the reader/writer 415 for increased coupling between the transformer primary winding 4122 and secondary winding 4121. A second such core 4124 may also be included in the transformer 4120 and associated with the secondary winding 4121 in the card for a further increase in coupling efficiency. In those arrangements where ample power is available and efficiency is not a consideration, one or both of these cores may be omitted. The use of a transformer for coupling power into a credit card was proposed by R. L. Billings in U.S. Pat. No 4,692,604 entitled "Flexible Inductor", issued Sep. 8, 1987 and assigned to American Telephone and Telegraph Company, AT&T Bell Laboratories.

Data reception to and transmission from the smart card 410 are provided by a capacitive interface connected to the analog interface 4130. This capacitive interface comprises four capacitors formed when electrodes or plates 4125 through 4128 on the smart card 410 are placed in close physical proximity to corresponding electrodes or plates 4155 through 4158 in the reader/writer 415. Two of these capacitors are used to transfer data to the smart card 410 from the reader/writer 415 and the remaining two are used to transfer data to the reader/writer 415 from the smart card 410. The combination of the inductive interface and the capacitive interface provides the complete communication interface between the reader/writer 415 and the smart card 410.

The organization of some of the components in the reader/writer 415 functionally mirror those in the smart card 410. Such components are, for example, an analog interface circuit 4140 and a point-of-sale terminal processor 424, which may be a microprocessor. In addition, the reader/writer 415 also includes a power supply 4162, which is used to provide power and also to couple a clock signal from the reader/writer 415 to the smart card 410 through the transformer 4120.

Analog interface circuit 4140 interfaces the reader/writer 415 with the point-of-sale terminal processor 424. Point-ofsale terminal processor 424 controls the operation of the power supply 4162, which is used to inductively transfer power to the smart card 410. The point-of-sale terminal processor 424 is coupled to a memory 420, which may be a conventional random-access memory (RAM) device, read-only memory (ROM), an erasable, programmable, read-only memory (EPROM), or the like.

Point-of-sale terminal processor 424 controls the operation of a conventional UPC bar code reader 426. Suitable devices for use as bar code reader 426 are disclosed, for example, in (a) U.S. Pat. No. 5,155,343, issued to Chandler et al. on Oct. 13, 1992, for an Omnidirectional Bar Code Reader with Method and Apparatus for Detecting and Scanning a Bar Code Symbol, (b) U.S. Pat. No. 5,124,537, issued to Chandler et al. on Jun. 23, 1992, for an Omnidirectional Bar Code Reader Using Virtual Scan of Video Raster Scan Memory, and (c) U.S. Pat. No. 5,079,412, issued to Sugiyama on Jan. 7, 1992 for a Point-of-Sale Data Processing Apparatus for Handy Type Bar Code Reader Which Can be Flush-Mounted. Some prior-art UPC bar code readers 426 include integrated point-of-sale terminal processors 424, whereas other prior-art UPC bar code readers 426 merely transform the optical UPC bar codes into a digital data stream which is capable of being interpreted by a microprocessor.

UPC bar code reader 426 is adapted to read conventional UPC bar codes. These UPC bar codes are presently affixed to and/or marked upon a variety of consumer goods, such as food items, building materials, electronic products, personal care products, magazines, books, or the like. Item 428 represents one such consumer good bearing a UPC bar code. The UPC bar code serves to identify specific items or item categories. The characteristics of conventional UPC bar codes are well-known to those skilled in the art.

Figure 11:
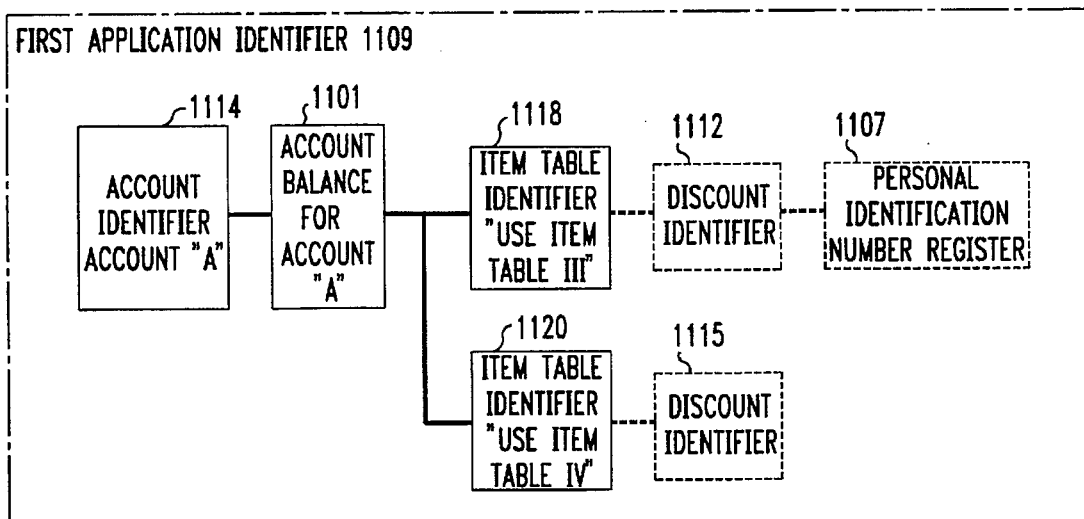
FIG. 11 sets forth data structures used by smart cards in accordance with a preferred embodiment of the invention.
Figure 11:
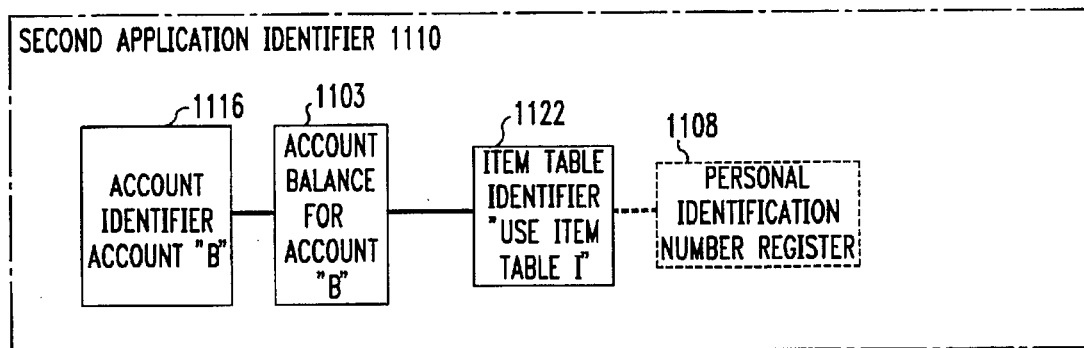
Figure 11:
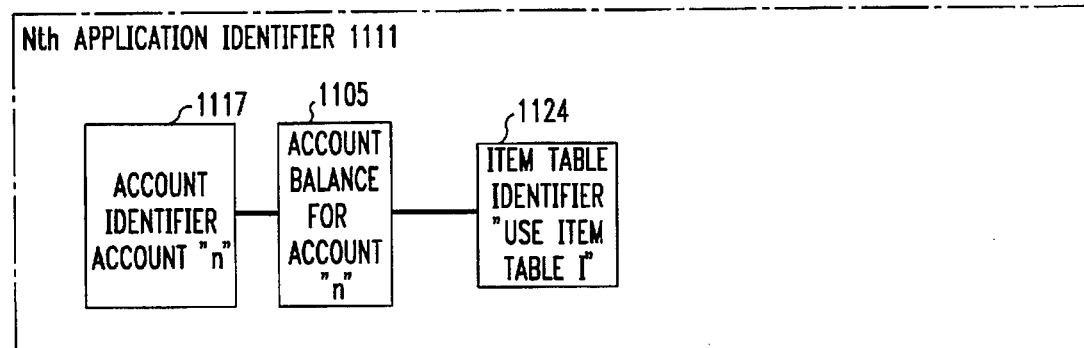

FIG. 11 sets forth data structures used by smart card 410 and stored in EEPROM 4115. One or more application identifiers 1109, 1110, 1111 are utilized. Each application identifier 1109, 1110, 1111 includes an account identifier 1114, 1116, 1117, respectively, which uniquely specifies a given account. Each account identifier 1114, 1116, 1117 is associated with an account balance field 1101, 1103, 1105, respectively, and each of these fields stores a numerical value representing account balance. An optional Personal Identification Number Register 1107 stores a numerical value corresponding to a personal identification number (PIN) held by a smart card user. Optional discount identifiers 1112, 1115 may also be utilized for the purpose of applying discounts to various purchases.

Each application identifier 1109, 1110, 1111 specifies the use of one or more specific item tables stored in memory 420 of the point-of-sale terminal 418. (The structure of memory 420 is to be described hereinafter with reference to FIG. 12.) In this manner, application identifiers assign specific accounts to corresponding item tables. For example, first application identifier 1109 includes two item table identifiers 1118, 1120, which specify "use Item Table III", and "use Item Table IV", respectively. Each account identifier 1114, 1116, 1117 is associated with at least one corresponding item table identifier, as shown with reference to fields 1118, 1120, 1122, and 1124, respectively. Field 1118 specifies the use of Item Table III, and field 1120 specifies the use of Item Table IV.

Figure 12:
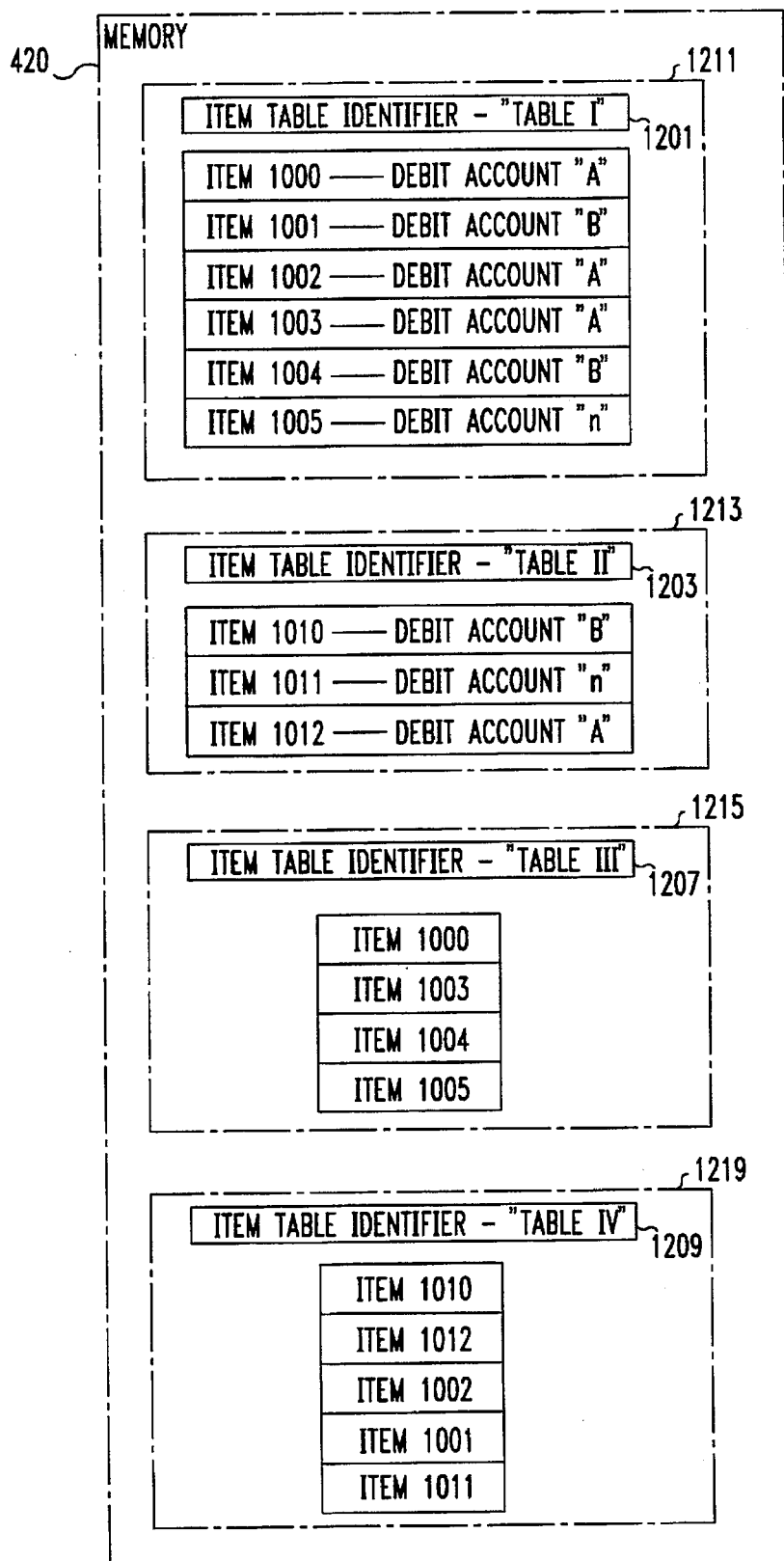
FIG. 12 sets forth data structures used by the point-of-sale terminal memory according to a preferred embodiment of the invention.

An alternate data structure is possible for the application identifiers shown in FIG. 11. Note that it is not necessary to associate specific accounts with corresponding item tables, because the item tables themselves may be adapted to associate each item identifier with a corresponding account, as will be described in greater detail with respect to FIG. 12. In the case where the application identifier does not directly specify specific accounts, the identifier merely includes one or more item table identifiers. For example, considering nth application identifier 1111, the Account Identifier—Account "n" 1117 and Account Balance for Account "n" 1105 fields would be eliminated, leaving only Item Table Identifier 1124. The resulting application identifier would then be employed in conjunction with item table identifiers having data structures as shown in FIG. 12 for Table I (1211) and Table II (1213). However, the resulting application identifier would not be used in conjunction with Tables III or IV (1215, 1219).

The optional Discount Identifier field 1112 may be utilized to specify one or more special discounts for which the card holder is to be eligible, such as, for example, a senior citizen's discount, a frequent shopper's discount, special promotional discounts, or the like. The discount may be applied to all items debited against the account specified in the Discount Identifier field 1112. Alternatively, the Discount Identifier field 1112 may specify one or more Item Tables, such as Table I, Table II, etc.

FIG. 12 sets forth data structures used by the point-of-sale terminal memory according to a preferred embodiment of the invention. The memory includes a plurality of item tables, such as Item Table I (1211), Item Table II (1213), Item Table III (1215), and Item Table IV (1219). Each item table 1211, 1213, 1215, 1219 includes an item table identifier 1201, 1203, 1207, 1209, respectively, which uniquely identifies a particular item table. Each Item Table 1211, 1213, 1215, 1219 also contains a list of items. For example, Table III (1215) contains a list specifying item 1000, item 1003, item 1004, and item 1005. Table IV (1219) contains a list specifying item 1010, item 1012, item 1002, item 1001, and item 1011. These items 1000–1005, 1010–1012 may represent, for example, consumer goods. More specifically, item 1000 could represent a particular brand of shampoo, item 1001 may represent a certain type of produce, item 1002 may represent a specific breakfast cereal, item 1003 could represent a pair of long-nosed pliers, and item 1004 may represent a green cardigan sweater.

Item Tables III and IV (1215, 1219, respectively) contain a list of items. The item tables 1215, 1219 would be employed in conjunction with application identifiers having the data structures shown in FIG. 11, as in the case of application identifiers 1109, 1110, and 1111. However, items may optionally be associated with a specific account, as shown in Item Tables I and II (1211 and 1213, respectively). For example, Item Table I (1211) associates item 1000 with Account "A", and Item 1001 with Account "B." In this manner, if item 1000 is purchased, Account "A" is debited for the cost of item 1000, and if item 1001 is purchased, Account "B" is debited for the cost of item 1001. In the case where the item tables themselves associate a given account with a given item, an application identifier specifying the use of such an item table does not include an account identifier, as was discussed above in connection with FIG. 11. For example, the data structures of Tables I and II (1211, 1213, respectively) would be employed in conjunction with application identifiers which do not specify particular accounts, but do contain a table identifier. If an account identifier is present, the terminal processor may be programmed to ignore it.

Figure 13:
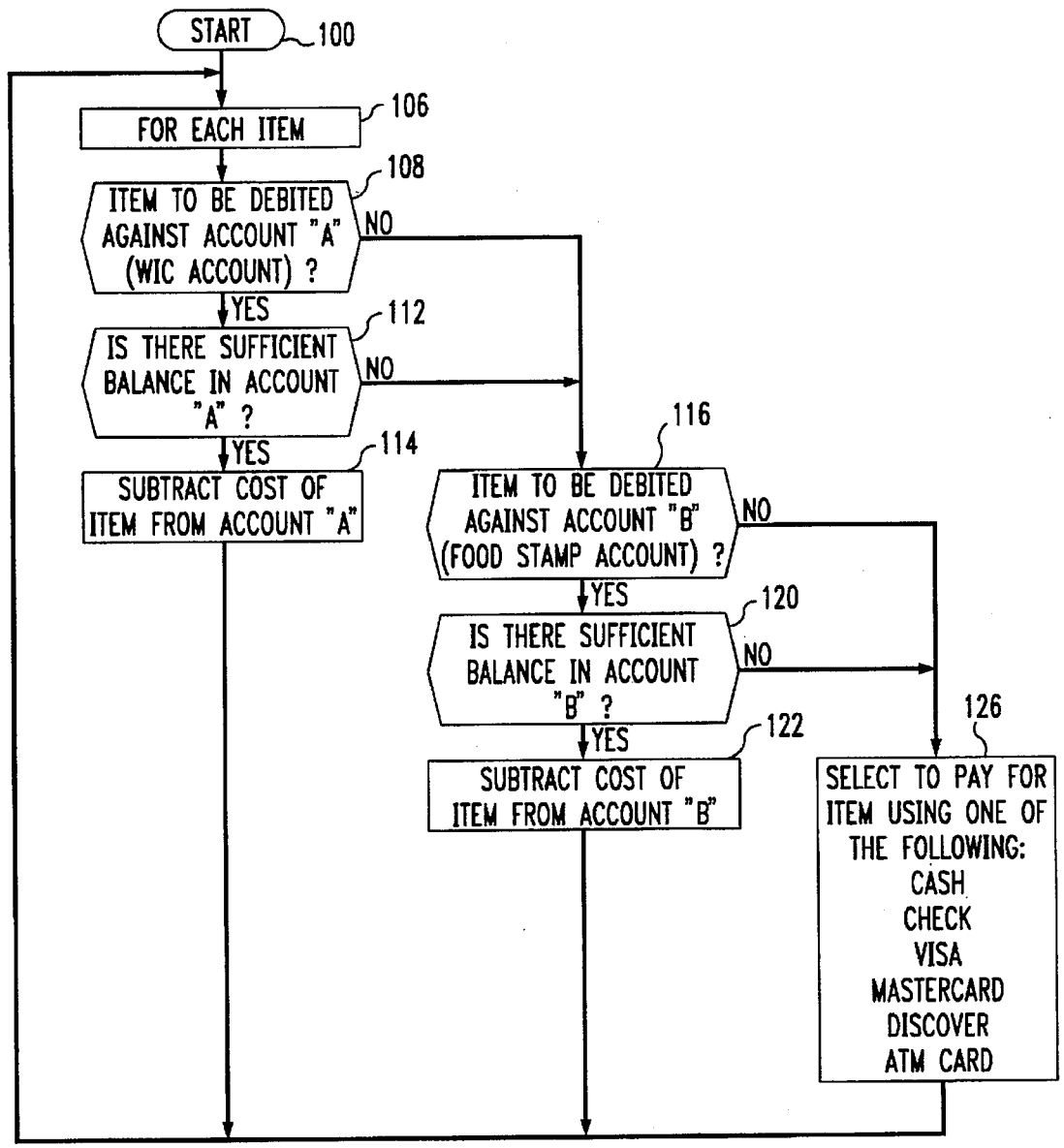
FIG. 13 is a flowchart illustrating the features of a preferred embodiment of the invention.

FIG. 13 is a flowchart illustrating the operational sequences implemented by a preferred embodiment of the invention. Program control starts at block 100. At block 106, the program commences execution for a specific item to be purchased by a consumer, such as, for example, item 1003 (FIG. 12). The program, at block 108, checks to see whether or not item 1003 is to be debited from a first account, such as Account "A" (FIG. 12). This function is accomplished with reference to the item table or tables (FIG. 12) stored in point-of-sale terminal memory 420 and specified by one or more application identifiers 1109, 1110 stored in smart card EEPROM 4115. Account "A" (FIG. 12) may represent a welfare program, such as, for example, the program commonly known as WIC. If item 1003 is to be debited from Account "A", the program checks to see whether sufficient balance is remaining in Account "A" to cover the cost of item 1003 (block 112). If there is insufficient account balance, program control jumps ahead to block 116, which implements functions to be described hereinafter. If sufficient account balance exists in Account "A", the program subtracts the cost of item 1003 from Account "A", and program control loops back to block 106, where the program is executed again for the next item to be purchased (if such an item exists).

If item 1003 is not to be debited from Account "A", the negative branch from block 108 leads to block 116 where the program tests to see whether item 1003 is to be debited from Account "B". In the example of FIG. 13, Account "B" represents a food stamp account. If the item is not to be debited from Account "B", program control jumps ahead to block 126, to be described in greater detail hereinafter. If the item is to be debited from Account "B", the program progresses to block 120, where a test is performed to ascertain whether or not there is sufficient account balance in Account "B". If not, the program jumps ahead to block 126, to be described below. If there is sufficient account balance in Account "B", the program progresses to block 122, where the cost of the item is subtracted from Account "B". The program then loops back to block 106, where the next item, if any, is considered.

The negative branches from blocks 116 and 120 lead to block 126. As a practical matter, block 126 is arrived at in the event that it is desired to purchase a given item, but insufficient account balances exist in the account or accounts against which the item may be debited. The procedure of block 126 allows for the purchase of the item from an alternative source of funds, such as, for example, cash, check, Visa, MasterCard, Discover and/or an ATM card. The purchaser may be offered a menu of various payment methods, selecting a method from the available options.

Although the flowchart of FIG. 13 refers to two accounts, Account "A" and Account "B", it is to be understood that the method of the present invention is applicable to any convenient number of accounts. Although the accounts described in the above example involved welfare programs, other types of accounts may be utilized for Account "A", Account "B", etc., such as conventional Visa, MasterCard, Discover, or other credit card accounts, as well as savings and/or checking accounts obtained through banks, savings & loans, credit unions, or the like.

Figure 14:
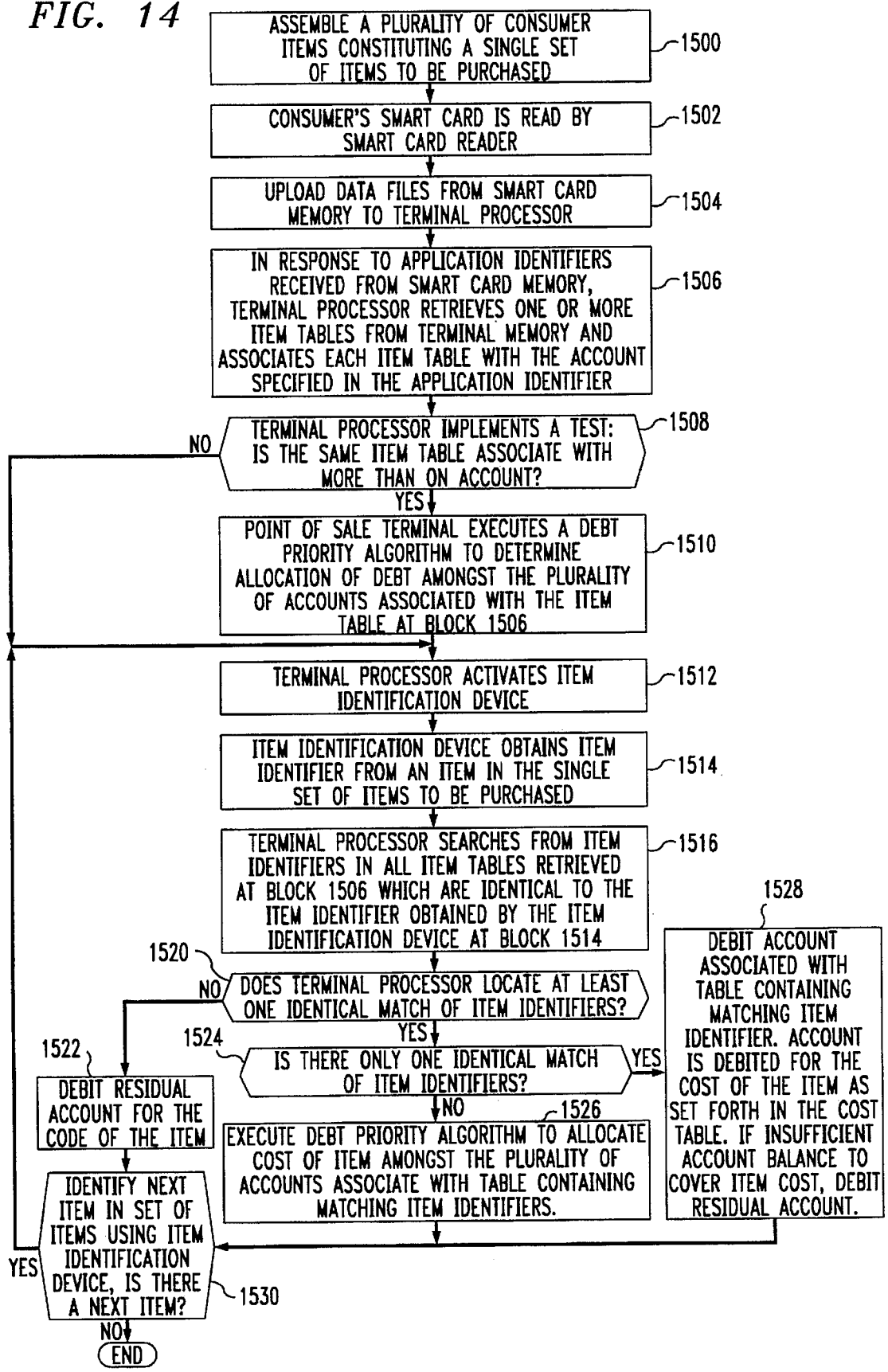
FIG. 14 is a flowchart which sets forth an operational sequence implemented by a preferred embodiment of the present invention.

FIG. 14 is a flowchart which sets forth an operational sequence implemented by a preferred embodiment of the present invention. This operational sequence is typically executed at the point-of-sale terminal 418 (FIG. 10) after a consumer has selected one or more items for purchase. The point-of-sale terminal 418 (FIG. 10) is typically situated at the checkout stand of a supermarket, grocery store, or department store. The consumer items may include a box of breakfast cereal, a carton of orange juice, a bottle of shampoo, laundry detergent, plastic garbage bags, frozen chicken, and several candy bars.

Using prior-art point-of-sale terminals in the context of certain types of consumers poses difficulties. For example, in the case of a consumer who is a welfare recipient, the welfare program may cover the cost of certain specific items, while excluding other items from consideration. Assume that a welfare program called WIC is designed to cover the costs of foods and other items which are essential to the health and welfare of "dependents", i.e., typically, young, growing children. However, the WIC program is deliberately designed to exclude certain non-essential or luxury items, so that welfare recipients do not have the freedom to squander program benefits on needless, frivolous, or harmful items. WIC program recipients are compelled to use benefits to cover the basic essentials of life. Accordingly, the WIC program may cover the costs of the orange juice, breakfast cereal, and laundry detergent in the aforementioned example, but exclude the cost of the candy bars as an unnecessary "luxury". Furthermore, assume that the specific brand of shampoo selected by the consumer is relatively expensive, and that the welfare program has been tailored to cover the cost of shampoo up to a certain fixed amount. With existing state-of-the-art point-of-sale terminals, the consumer and/or the checkout clerk must segregate welfare-eligible items from other items. Moreover, after the items are segregated, additional computations may be required to coordinate the benefits of various welfare programs. These aforementioned steps may cause unnecessary delays, decrease the efficiency of the checkout clerk, and result in errors where the consumer is not given credit for welfare-eligible items, and/or given credit for non-eligible items.

The shortcomings of existing point-of-sale terminals discussed in the above paragraph are not endemic to welfare programs. For example, non-welfare customers may wish to use their credit cards to pay only for food items, while paying for non-food items in cash. Similarly, customers may wish to use a first credit card to purchase certain types of items, and a second credit card to purchase other types of items. In the case of a husband-wife team shopping at the neighborhood market, each partner having his/her own credit card, the couple may wish to split the cost of some items 50–50, while at the same time charging the entire costs of some items to the account of one partner only. Such arrangements are not possible to implement using existing point-of-sale terminals, unless separate point-of-sale transactions are used for husband and wife.

The aforementioned limitations and shortcomings of existing point-of-sale terminals may be overcome by implementing the operational sequence of FIG. 14. The operational sequence of FIG. 14 commences at block 1500, where a plurality of consumer items constituting a single set of items to be purchased are assembled at a point-of-sale terminal. Next, the consumer's smart card is read by the smart card reader 415 (FIG. 10) at the point-of-sale terminal (FIG. 14, block 1502). Data files are uploaded from the smart card memory (i.e., EEPROM 4115 of FIG. 10), into the terminal processor 424 (FIG. 10) at block 1504. These data files include the application identifiers 1109, 1110, 1111 shown in FIG. 11. In response to the application identifiers received from smart card memory, the terminal processor retrieves one or more item tables (FIG. 12, 1211, 1213, 1215, 1219) from terminal memory. Each item table is associated with the account specified in the application identifier which was uploaded from smart card memory (FIG. 14, block 1506) or, alternatively, the item table identifier uploaded from the smart card determines the account and item table to be used by the point-of-sale terminal processor.

At block 1508, the terminal processor implements a test for each item table retrieved from terminal memory to ascertain whether or not the item table is associated with more than one account. If a given item table is associated with more than one account, program control progresses to block 1510 where the point-of-sale terminal processor executes a debt priority algorithm to determine allocation of debt amongst the plurality of accounts associated with the item table retrieved from terminal memory at block 1506. This debt priority algorithm is designed to meet the needs of specific system applications, and performs the function of resolving conflicts where one item corresponds to more than one account. For example, a suitable debt priority algorithm for some applications may provide that, wherever a first account and a second account are both associated with a given item, the item will always be paid for using the second account, so long as sufficient balance exists in the second account. However, if the second account does not include sufficient balance to cover the cost of the item, then the first account will be debited. A suitable debt priority algorithm for other applications would provide that, wherever a first account and a second account are both associated with a given item, the cost of the item will be divided proportionally among the accounts, using a fixed debt ratio such as 50–50 or 60–40. However, the above examples of debt priority allocation algorithms are intended to be illustrative. The characteristics, structure, and operation of other debt priority allocation algorithms is a matter within the knowledge of those skilled in the art.

Block 1512 is reached from the negative branch of block 1508 or, alternatively, after the operations in block 1510 are performed. At block 1512, the terminal processor activates the item identification device, i.e., UPC bar code reader 426 (FIG. 10). The item identification device obtains an item identifier from an item in the single set of items to be purchased (FIG. 14, block 1514). At block 1516, the terminal processor searches throughout all of the item tables which were retrieved at block 1506 for an item identifier which is identical to the item identifier obtained by the item identification device at block 1514.

At block 1520, a test is performed to ascertain whether the terminal processor located at least one identical match of item identifiers. If not, program control progresses to block 1522, where a residual account is debited for the cost of the item. This residual account is used to track items which are identified by the item identification device but not listed in any of the item tables retrieved by the terminal processor at block 1506. After all items to be purchased have been identified, the total balance of the residual account can be debited against one of the customer's accounts, for example, by selecting the account using a point-of-sale terminal input device such as keypad interfaced with the terminal processor. Alternatively, to pay for the residual account balance, the point-of-sale terminal processor may be programmed (1) to debit the customer's account having the highest balance, (2) to allow only for the debiting of certain accounts but not others from the point-of-sale terminal input device, and/or (3) to permit cash payments by the customer.

After the residual account is debited at block 1522, program control progresses to block 1530, where a test is performed to ascertain whether or not there is another item at the point-of-sale terminal in the set of items to be submitted for purchase. If not, the program ends. If so, the program loops back to block 1516.

The affirmative branch from block 1520 leads to block 1524, where a test is performed to ascertain whether there is one and only one identical match of item identifiers. If so, program control transfers to block 1528, where the account associated with the table containing the matching item identifier is debited. The account is debited for the cost of the item as set forth in the cost table. If the account has insufficient balance to cover the cost of the item, the residual account is debited. The cost of the item may be downloaded from the terminal processor to the smart card processor at this point. Alternatively, due to the fact that the account balances were uploaded from the smart card to the point-of-sale terminal as part of the application identifier, the terminal processor may subtract item costs from the uploaded account balances on an item-by-item basis as each item is identified by the item identification device. This subtraction occurs within the point-of-sale terminal. Once the last item has been identified by the item identification device, new account balances are then downloaded from the terminal processor to the smart card processor. After the operations of block 1528 are performed, the program advances to block 1530, described above.

The negative branch from block 1524 leads to block 1526, where the aforementioned debt priority algorithm is executed to allocate the cost of the item amongst the plurality of accounts associated with the tables containing matching item identifiers. The program then advances to block 1530, described above.

What is claimed:

1. A method of programming a smart card including the step of downloading into the smart card a plurality of application identifiers, each application identifier associating an item table identifier with any of a plurality of accounts stored on the smart card, the item table identifier uniquely specifying an item table including a list of consumer items.

2. A smart card including:
   a) means for storing a plurality of application identifiers, each application identifier associating an item table identifier with any of a plurality of accounts stored on the smart card, the item table identifier uniquely specifying an item table containing a list of consumer items;
   b) means for uploading at least one of the plurality of application identifiers into a point-of-sale terminal.

3. A smart card for use in a system, the system comprising:
   a) a point-of-sale terminal having
      i) item identification means for identifying specific consumer items or specific categories of consumer items;
      ii) terminal memory means; and
      iii) terminal processing means coupled to the terminal memory means and the item identification means; and
   b) a smart card having smart card memory means and smart card processing means;

CHARACTERIZED IN THAT the smart card memory means is loaded with at least one application identifier including an account identifier for uniquely specifying an account, a numerical value representing the balance of the account, and an item table identifier for uniquely identifying an item table from among a plurality of item tables stored in the terminal memory means; each of the item tables including a list of consumer items.

4. A system as set forth in claim 3 wherein at least one of the plurality of item tables associates specific consumer items with specific accounts.

5. A system comprising:
   a) a point-of-sale terminal having
      i) item identification means for identifying specific consumer items or specific categories of consumer items;

ii) terminal memory means; and iii) terminal processing means coupled to the terminal memory means and the item identification means; and b) a smart card having smart card memory means and smart card processing means;

CHARACTERIZED IN THAT the terminal memory means is loaded with a plurality of item tables, each item table being uniquely identified by an item table identifier corresponding to the item table; and the smart card memory means is loaded with at least one application identifier including an account identifier for uniquely specifying an account, a numerical value representing the balance of the account, and an item table identifier for uniquely identifying an item table from among a plurality of item tables stored in the terminal memory means.

6. A system as set forth in claim 5 wherein at least one of the item tables associates specific consumer items with specific accounts.

* * * * *